(12) United States Patent
Matsumoto et al.

(10) Patent No.: US 11,199,152 B2
(45) Date of Patent: Dec. 14, 2021

(54) CONTROL APPARATUS FOR COMPRESSION-IGNITION TYPE ENGINE

(71) Applicant: Mazda Motor Corporation, Hiroshima (JP)

(72) Inventors: Kota Matsumoto, Aki-gun (JP); Tomonori Urushihara, Aki-gun (JP); Keiji Maruyama, Aki-gun (JP); Masanari Sueoka, Aki-gun (JP); Ryohei Ono, Aki-gun (JP); Yuji Harada, Aki-gun (JP); Toru Miyamoto, Aki-gun (JP); Atsushi Inoue, Aki-gun (JP); Tatsuhiro Tokunaga, Aki-gun (JP); Takuya Ohura, Aki-gun (JP); Yusuke Kawai, Aki-gun (JP); Tomohiro Nishida, Aki-gun (JP); Keita Arai, Aki-gun (JP); Yodai Yamaguchi, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/051,649

(22) PCT Filed: Apr. 17, 2019

(86) PCT No.: PCT/JP2019/016532
§ 371 (c)(1),
(2) Date: Oct. 29, 2020

(87) PCT Pub. No.: WO2019/211983
PCT Pub. Date: Nov. 7, 2019

(65) Prior Publication Data
US 2021/0231078 A1    Jul. 29, 2021

(30) Foreign Application Priority Data

May 2, 2018 (JP) .............................. JP2018-088662

(51) Int. Cl.
*F02D 41/30* (2006.01)
*F02B 31/04* (2006.01)
(Continued)

(52) U.S. Cl.
CPC .......... *F02D 41/3047* (2013.01); *F02B 31/04* (2013.01); *F02D 41/401* (2013.01);
(Continued)

(58) Field of Classification Search
CPC ...... F02D 41/02; F02D 41/3047; F02D 41/40; F02D 41/401; F02D 41/402;
(Continued)

(56) References Cited

U.S. PATENT DOCUMENTS

| 6,267,097 B1 | 7/2001 | Urushihara et al. |
| 2002/0059914 A1 | 5/2002 | Yamaguchi et al. |

(Continued)

FOREIGN PATENT DOCUMENTS

| JP | 2001003771 A | 1/2001 |
| JP | 2002155780 A | 5/2002 |

(Continued)

*Primary Examiner* — John Kwon
*Assistant Examiner* — Johnny H Hoang
(74) *Attorney, Agent, or Firm* — Alleman Hall Creasman & Tuttle LLP

(57) ABSTRACT

Provided is an ignition control section and an injection control section. When partial compression ignition combustion is carried out, the ignition control section causes an ignition plug to carry out: main ignition in which a spark is generated in a late period of a compression stroke or an initial period of an expansion stroke to initiate SI combustion; and preceding ignition in which the spark is generated at earlier timing than the main ignition. Also, when the partial compression ignition combustion is carried out, the injection control section causes an injector to inject fuel at such timing that the fuel exists in a cylinder at an earlier time (Continued)

point than the preceding ignition. Ignition timing of the preceding ignition is set to be more retarded when an in-cylinder pressure specified by an in-cylinder pressure specification section is high than when the in-cylinder pressure is low.

20 Claims, 19 Drawing Sheets

(51) Int. Cl.
    *F02D 41/40*     (2006.01)
    *F02P 5/04*     (2006.01)
    *F02P 5/153*     (2006.01)
    *F02P 15/08*     (2006.01)

(52) U.S. Cl.
    CPC ............ *F02D 41/402* (2013.01); *F02P 5/045* (2013.01); *F02P 5/153* (2013.01); *F02P 15/08* (2013.01); *F02D 2200/024* (2013.01); *F02D 2200/04* (2013.01); *F02D 2200/10* (2013.01); *F02D 2200/602* (2013.01)

(58) Field of Classification Search
    CPC ........... F02D 2200/024; F02D 2200/04; F02D 2200/10; F02D 2200/602; F02D 45/00; F02B 31/04; F02B 31/08; F02B 23/08; F02B 23/10; F02P 5/045; F02P 5/153; F02P 15/08
    See application file for complete search history.

(56) References Cited

U.S. PATENT DOCUMENTS

| | | | |
|---|---|---|---|
| 2002/0073957 A1* | 6/2002 | Urushihara | ............. F02P 5/045 123/299 |
| 2006/0201475 A1 | 9/2006 | Shiraishi | |
| 2007/0199533 A1* | 8/2007 | Takahashi | ............. F02P 5/1502 123/179.4 |
| 2016/0215707 A1* | 7/2016 | Miyamoto | ............. F02M 25/12 |
| 2016/0252031 A1* | 9/2016 | Nagatsu | .................. F02D 41/02 123/305 |
| 2019/0107040 A1* | 4/2019 | Tsumura | ................ F02D 41/006 |
| 2019/0186405 A1* | 6/2019 | Sueoka | ..................... F02B 1/10 |
| 2019/0226419 A1* | 7/2019 | Zhou | ......................... F02B 5/02 |

FOREIGN PATENT DOCUMENTS

| | | |
|---|---|---|
| JP | 2003049691 A | 2/2003 |
| JP | 2006002637 A | 1/2006 |
| JP | 2009108778 A | 5/2009 |
| JP | 4691373 B2 | 6/2011 |

* cited by examiner

CONTROL APPARATUS FOR COMPRESSION-IGNITION TYPE ENGINE

TECHNICAL FIELD

The present invention relates to a control apparatus for a compression-ignition type engine capable of carrying out partial compression ignition combustion to subject some of air-fuel mixture to SI combustion by spark ignition and to subject the rest of the air-fuel mixture to CI combustion by self-ignition.

BACKGROUND ART

Recently, attention has been paid to HCCI combustion. In the HCCI combustion, gasoline fuel that is mixed with air is sufficiently compressed in a combustion chamber and is burned by self-ignition. The HCCI combustion is a mode of combustion in which air-fuel mixture is simultaneously and frequently burned. Thus, a combustion velocity of the air-fuel mixture is higher in the HCCI combustion than in spark ignition combustion (SI combustion) that is adopted in a normal gasoline engine, and it is said that the HCCI combustion is extremely advantageous over the SI combustion in terms of thermal efficiency. However, the HCCI combustion has a problem that combustion initiation timing (timing at which the air-fuel mixture is self-ignited) significantly varies due to an external factor such as a temperature, and also has a problem that it is difficult to control the HCCI combustion during transient operation that causes an abrupt change in an amount of a load.

For the above reason, it has been proposed to burn some of the air-fuel mixture by the spark ignition using an ignition plug instead of burning the entire air-fuel mixture by self-ignition. That is, some of the air-fuel mixture is forcibly burned by flame propagation with the spark ignition as a start (SI combustion), and the rest of the air-fuel mixture is burned by the self-ignition (CI combustion). Hereinafter, such combustion will be referred to as partial compression ignition combustion.

As an example of an engine for which a similar concept to the partial compression ignition combustion is adopted, an engine disclosed in Patent Literature 1 has been known. The engine disclosed in Patent Literature 1 subjects stratified air-fuel mixture, which is produced around the ignition plug (a spark plug) by auxiliary fuel injection, to flame propagation combustion by the spark ignition, and carries out main fuel injection to the combustion chamber at a high temperature due to action of the combustion (flame), so as to burn the fuel, which is injected by this main fuel injection, by the self-ignition.

Meanwhile, it has also been proposed to improve the thermal efficiency of the engine by another method not using compression ignition combustion. For example, Patent Literature 2 discloses a spark-ignition engine that carries out the spark ignition by the ignition plug twice per cycle. More specifically, in the spark-ignition engine disclosed in the same literature, preceding ignition is carried out to supply such low ignition energy that not the entire air-fuel mixture in the combustion chamber is ignited or burned (that a fire is locally generated) during a compression stroke, and at appropriate timing after this preceding ignition, main ignition is carried out to supply the higher ignition energy than that in the preceding ignition. Just as described, by producing the fire by the preceding ignition at an earlier stage than the main ignition, it is possible to prevent misfire of the air-fuel mixture and to increase the combustion velocity.

Here, in the partial compression ignition combustion, the combustion velocity of the CI combustion has an impact on the thermal efficiency. Since the CI combustion is a phenomenon in which a spontaneous chemical reaction of a fuel component occurs, it can be said that the combustion velocity thereof is higher by nature than that of the SI combustion in which a combustion region is gradually expanded by the flame propagation. Meanwhile, it is considered that, if a property of the fuel can be modified to show high reactivity prior to the CI combustion, for example, the combustion velocity of the CI combustion is further increased, the thermal efficiency is thereby further improved, and thus fuel consumption performance and torque performance can be balanced.

The property of the fuel can possibly be modified to have the high reactivity when a temperature of the air-fuel mixture is increased to fall within a specified temperature range, for example. That is, when the fuel component (hydrocarbons) is cleaved due to the increase in the temperature of the air-fuel mixture, an intermediate product including OH radicals with the high reactivity is produced. As means for increasing the temperature of the air-fuel mixture to modify the property of the fuel (to produce the intermediate product), the inventors of the present application considered to carry out plural times of the spark ignition, that is, to carry out the auxiliary preceding ignition prior to the main ignition so as to increase the temperature of the air-fuel mixture as in the case of Patent Literature 2 described above, for example. However, it was understood from the study by the inventors of the present application that, in the case where the preceding ignition was carried out at such timing that some of the air-fuel mixture was burned as in Patent Literature 2, a significant amount of the intermediate product was consumed by such combustion, which prevented an effect of increasing the combustion velocity of the CI combustion from being sufficiently exerted.

CITATION LIST

Patent Literature

Patent Literature 1: JP-A-2009-108778
Patent Literature 2: Japanese Patent No. 4691373

SUMMARY OF INVENTION

The present invention has been made in view of circumstances as described above and therefore has a purpose of providing a control apparatus for a compression-ignition type engine capable of carrying out partial compression ignition combustion at a high combustion velocity and with superior thermal efficiency.

In order to solve the problem, the present invention is a control apparatus for controlling a compression-ignition type engine that includes: a cylinder; an injector that injects fuel into the cylinder; and an ignition plug that ignites air-fuel mixture, in which the fuel injected from the injector and air are mixed, and that can carry out partial compression ignition combustion to subject some of the air-fuel mixture to SI combustion by spark ignition using the ignition plug and to subject the rest of the air-fuel mixture to CI combustion by self-ignition. The control apparatus includes: an in-cylinder pressure specification section that specifies an in-cylinder pressure as a pressure in the cylinder; an injection control section that controls fuel injection operation by the injector; and an ignition control section that controls ignition operation by the ignition plug. When the partial compression ignition combustion is carried out, the ignition control section causes the ignition plug to carry out: main ignition in which a spark is generated in a late period of a compression stroke or an initial period of an expansion stroke to initiate the SI combustion; and preceding ignition in which the spark is generated at earlier timing than the main ignition. When the partial compression ignition combustion is carried out, the injection control section causes the injector to inject the fuel at such timing that the fuel exists in the cylinder at an earlier time point than the preceding ignition. Timing of the preceding ignition is set to be more retarded when the in-cylinder pressure specified by the in-cylinder pressure specification section is high than when the in-cylinder pressure is low.

This control apparatus for the compression-ignition type engine can carry out partial compression ignition combustion at a high combustion velocity and with superior thermal efficiency.

DESCRIPTION OF EMBODIMENTS

A description will hereinafter be made on an embodiment of the invention with reference to the accompanying drawings. The following embodiment is an example in which the present invention is embodied and does not have a property of limiting the technical scope of the present invention.

(1) OVERALL CONFIGURATION OF ENGINE

Figure 1:
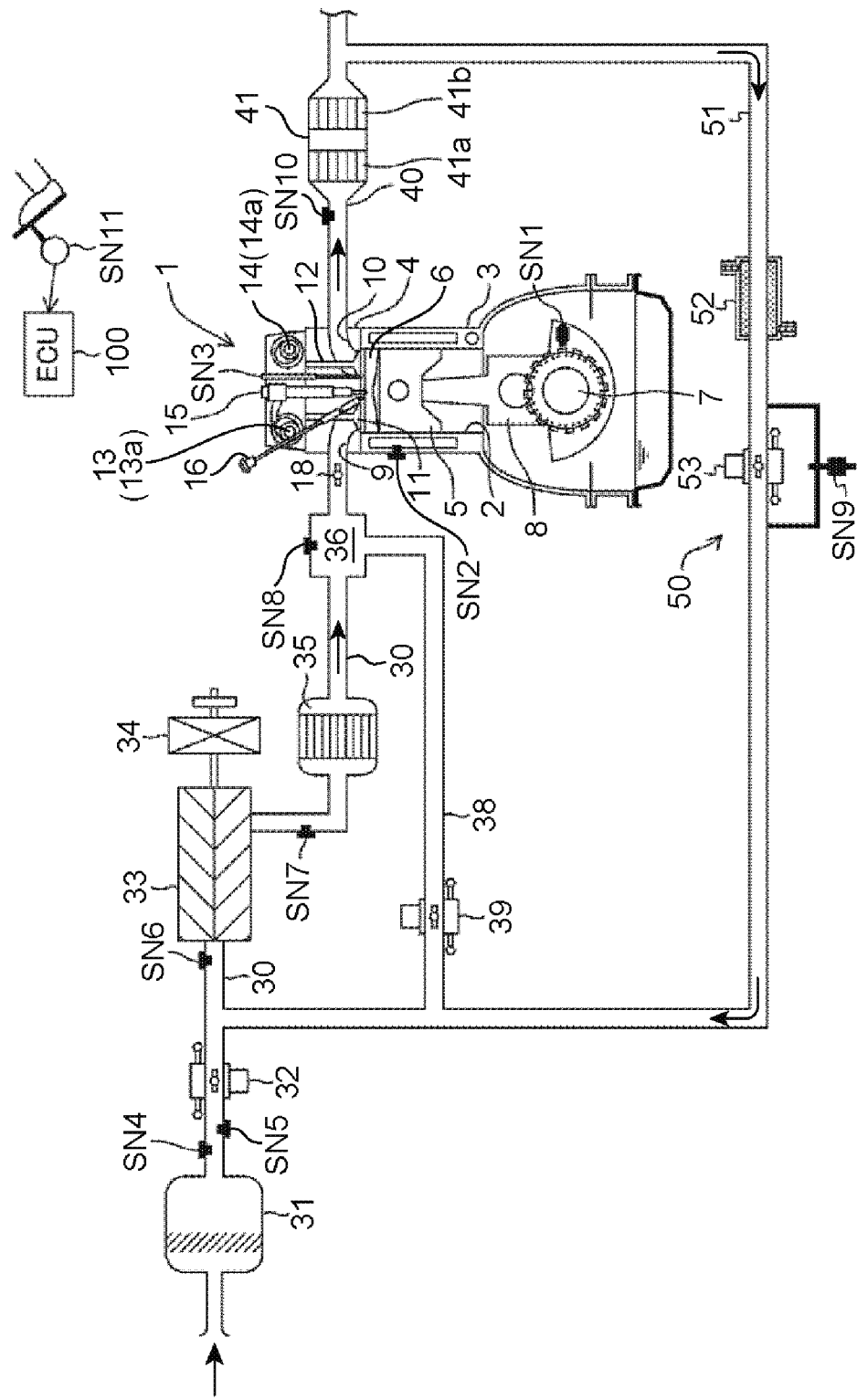
FIG. 1 is a system view that schematically illustrates an overall configuration of a compression-ignition type engine according to an embodiment of the present invention.
Figure 2:
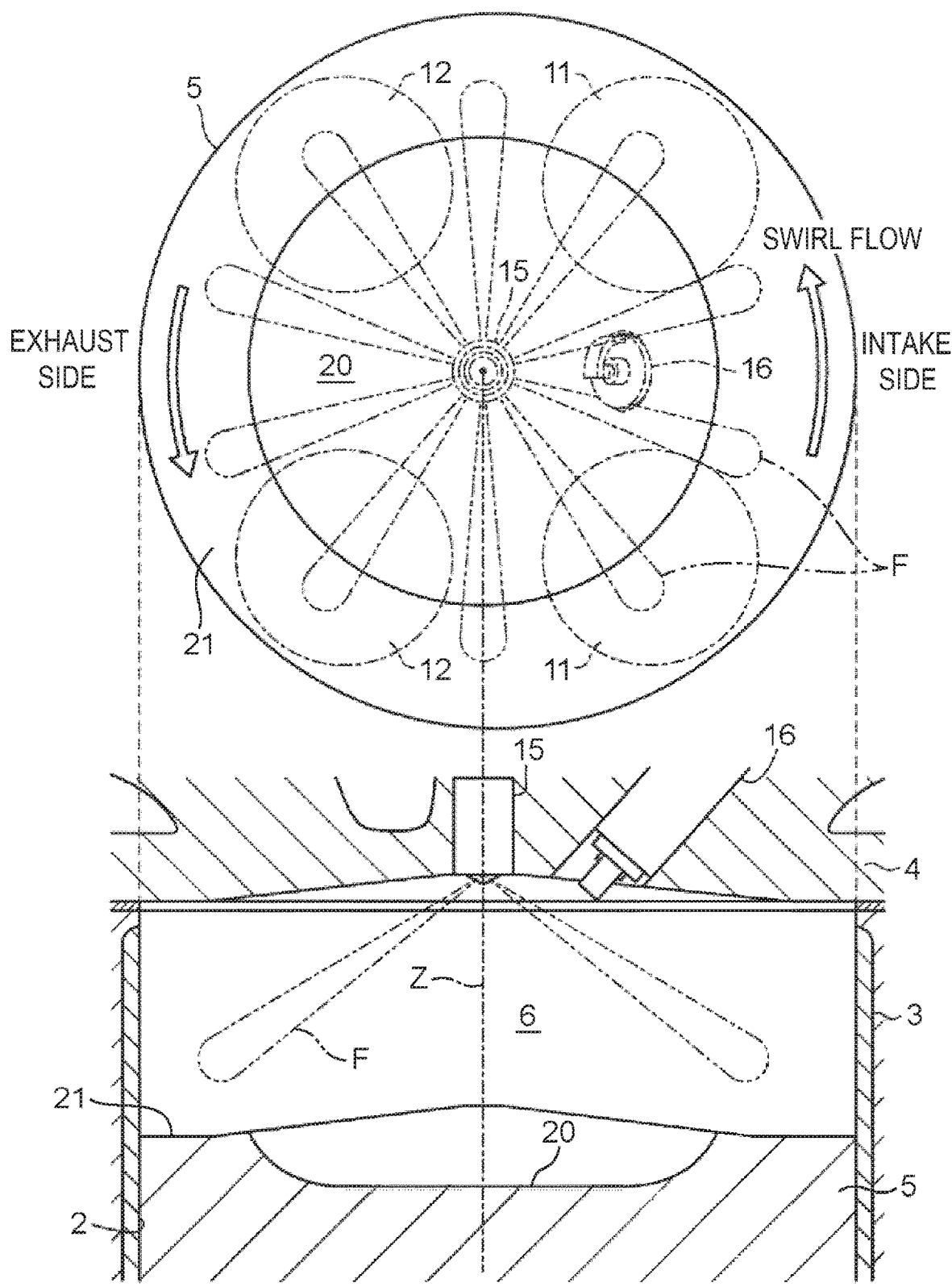
FIG. 2 is a view illustrating a cross-sectional view of an engine body and a plan view of a piston.

FIG. 1 and FIG. 2 are views illustrating a preferred embodiment of a compression-ignition type engine (hereinafter simply referred to as an engine), to which a control apparatus according to the present invention is applied. The engine illustrated in the drawings is a four-cycle direct gasoline-injection engine that is mounted as a travel power source on a vehicle, and includes: an engine body 1; an intake passage 30 through which intake air to be introduced into the engine body 1 flows; an exhaust passage 40 through which exhaust gas discharged from the engine body 1 flows; and an external EGR device 50 that circulates some of the exhaust gas flowing through the exhaust passage 40 into the intake passage 30.

The engine body 1 has: a cylinder block 3 formed with a cylinder 2 therein; a cylinder head 4 that is attached to an upper surface of the cylinder block 3 in a manner to close the cylinder 2 from above; and a piston 5 that is inserted in a slidingly reciprocal manner in the cylinder 2. Typically, the engine body 1 is of a multicylinder type that has plural (for example, four) cylinders. However, a description will herein be made by focusing on the single cylinder 2 for simplification of the description.

A combustion chamber 6 is defined above the piston 5, and this combustion chamber 6 is supplied with fuel having gasoline as a main component by injection from an injector 15, which will be described below. Then, the supplied fuel is mixed with air and burned in the combustion chamber 6, and consequently, the piston 5 that is pushed down by an expansion force generated by the combustion reciprocates vertically. The fuel that is injected into the combustion chamber 6 only needs to contain gasoline as the main component and may contain a secondary component such as bioethanol in addition to gasoline, for example.

A crankshaft 7 that is an output shaft of the engine body 1 is provided below the piston 5. The crankshaft 7 is coupled to the piston 5 via a connecting rod 8, and is driven to rotate about a center axis according to reciprocal motion (vertical motion) of the piston 5.

A geometric compression ratio of the cylinder 2, that is, a ratio between a volume of the combustion chamber 6 at the time when the piston 5 is at the top dead center and the volume of the combustion chamber at the time when the piston 5 is at the bottom dead center is set to a value that is suited for partial compression ignition combustion (SPCCI combustion), which will be described below, and is equal to or higher than 13 and equal to or lower than 30, preferably, equal to or higher than 14 and equal to or lower than 18. In detail, the geometric compression ratio of the cylinder 2 is preferably set to be equal to or higher than 14 and equal to or lower than 17 in a case of a regular specification for which gasoline fuel at octane rating of approximately 91 is used, and is preferably set to be equal to or higher than 15 and equal to or lower than 18 in a case of a high-octane specification for which the gasoline fuel at the octane rating of approximately 96 is used.

The cylinder block 3 is provided with: a crank angle sensor SN1 that detects a rotation angle (a crank angle) of the crankshaft 7 and a rotational speed of the crankshaft 7 (an engine speed); and a coolant temperature sensor SN2 that detects a temperature of a coolant (an engine coolant temperature) flowing through the cylinder block 3 and the cylinder head 4.

The cylinder head 4 is provided with: an intake port 9 and an exhaust port 10, each of which is opened to the combustion chamber 6; an intake valve 11 that opens/closes the intake port 9; and an exhaust valve 12 that opens/closes the exhaust port 10. As illustrated in FIG. 2, a valve type of the engine in this embodiment is a four-valve type having two intake valves and two exhaust valves. That is, the intake port 9 includes a first intake port 9A and a second intake port 9B, and the exhaust port 10 includes a first exhaust port 10A and a second exhaust port 10B (see FIG. 3). The single intake valve 11 is provided for each of the first intake port 9A and the second intake port 9B. The single exhaust valve 12 is provided for each of the first exhaust port 10A and the second exhaust port 10B.

Figure 3:
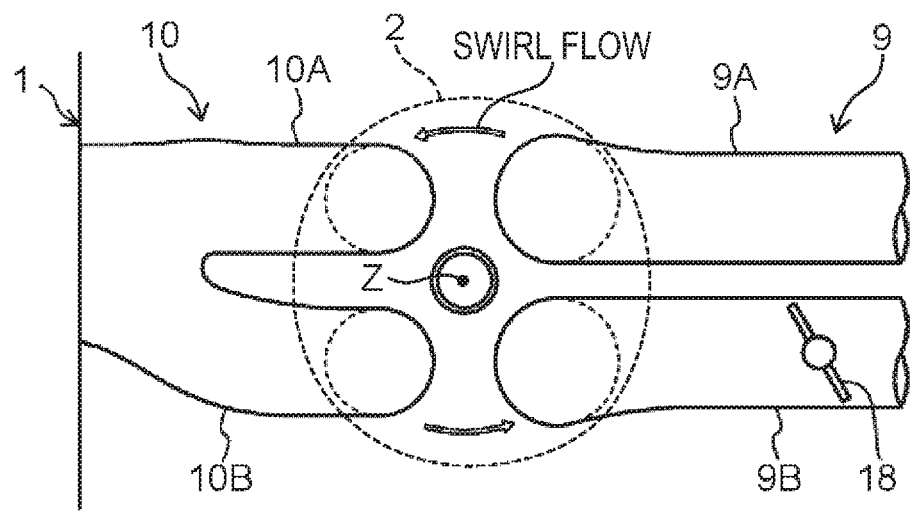
FIG. 3 is a schematic plan view illustrating structures of a cylinder and intake/exhaust systems near the cylinder.

As illustrated in FIG. 3, the second intake port 9B is provided with an openable/closable swirl valve 18. The swirl valve 18 is only provided in the second intake port 9B and is not provided in the first intake port 9A. When such a swirl valve 18 is driven to be closed, a ratio of the intake air that flows into the combustion chamber 6 from the first intake port 9A, which is not provided with the swirl valve 18, is increased. As a result, a spiral flow that circles around a cylinder axis Z (a center axis of the combustion chamber 6), that is, a swirl flow can be intensified. On the other hand, when the swirl valve 18 is driven to be opened, the swirl flow can be weakened. The intake port 9 in this embodiment is a tumble port that can generate a tumble flow (a vertical vortex). Thus, the swirl flow that is generated at the time when the swirl valve 18 is closed is an oblique swirl flow that is mixed with the tumble flow.

The intake valves 11 and the exhaust valves 12 are driven to be opened/closed in an interlocking manner with the rotation of the crankshaft 7 by valve mechanisms 13, 14 that include a pair of camshafts and the like disposed in the cylinder head 4.

The valve mechanism 13 for the intake valves 11 includes an intake VVT 13a capable of changing open/close timing of the intake valves 11. Similarly, the valve mechanism 14 for the exhaust valves 12 includes an exhaust VVT 14a capable of changing open/close timing of the exhaust valves 12. The intake VVT 13a (the exhaust VVT 14a) is a so-called phase-type variable mechanism and simultaneously changes the open timing and the close timing of the intake valves 11 (the exhaust valves 12) by the same amount. With control by these intake VVT 13a and exhaust VVT 14a, in this embodiment, it is possible to adjust a valve overlapping period in which both of the intake valve 11 and the exhaust valve 12 are opened across exhaust top dead center. In addition, it is possible to adjust an amount of burned gas (internal EGR gas) that remains in the combustion chamber 6 by adjusting this valve overlapping period. The intake VVT 13a and the exhaust VVT 14a correspond to examples of the "temperature adjustment device" in the claims.

The cylinder head 4 is provided with: an injector 15 that injects the fuel (mainly, the gasoline) into the combustion chamber 6; and an ignition plug 16 that ignites air-fuel mixture produced by mixing the fuel injected into the combustion chamber 6 from the injector 15 and the air introduced into the combustion chamber 6. The cylinder head 4 is further provided with an in-cylinder pressure sensor SN3 that detects a pressure in the combustion chamber 6 (hereinafter also referred to as an in-cylinder pressure). The in-cylinder pressure sensor SN3 corresponds to an example of the "in-cylinder pressure specification section" or the "in-cylinder pressure correlation value sensor" in the claims.

As illustrated in FIG. 2, a cavity 20 is formed in a crown surface of the piston 5. The cavity 20 is formed by recessing a relatively large area including a central portion of the crown surface in an opposite (downward) direction from the cylinder head 4. In addition, a squished section 21 having a ring-shaped flat surface is formed on a radially outer side of the cavity 20 in the crown surface of the piston 5.

The injector 15 is an injector of a multiple injection-port type that has plural injection ports at a tip, and can radially inject the fuel from the plural injection ports (F in FIG. 2 represents a spray of the fuel injected from each of the injection ports). The injector 15 is arranged in a central portion of a ceiling surface of the combustion chamber 6 such that the tip thereof opposes the central portion of the crown surface of the piston 5 (a center of a bottom portion of the cavity 20).

The ignition plug 16 is arranged at a position that is substantially shifted to the intake side from the injector 15. A position of a tip (an electrode) of the ignition plug 16 is set to overlap with the cavity 20 in a plan view.

As illustrated in FIG. 1, the intake passage 30 is connected to a side surface of the cylinder head 4 in a manner to communicate with the intake port 9. The air (fresh air) that is suctioned from an upstream end of the intake passage 30 is introduced into the combustion chamber 6 through the intake passage 30 and the intake port 9.

In the intake passage 30, an air cleaner 31, an openable/closable throttle valve 32, a supercharger 33, an intercooler 35, and a surge tank 36 are sequentially provided from an upstream side. The air cleaner 31 removes foreign substances in the intake air, the throttle valve 32 adjusts a flow rate of the intake air, the supercharger 33 compresses the intake air and delivers the compressed intake air, and the intercooler 35 cools the intake air that is compressed by the supercharger 33.

An airflow sensor SN4 that detects the flow rate of the intake air, first and second intake temperature sensors SN5, SN7, each of which detects the temperature of the intake air, and first and second intake pressure sensors SN6, SN8, each of which detects a pressure of the intake air, are provided in portions of the intake passage 30. The airflow sensor SN4 and the first intake temperature sensor SN5 are provided in the portion of the intake passage 30 between the air cleaner 31 and the throttle valve 32 and detects the flow rate and the temperature of the intake air that flows through such a portion. The first intake pressure sensor SN6 is provided in a portion of the intake passage 30 between the throttle valve 32 and the supercharger 33 (on a downstream side of a connection port of an EGR passage 51, which will be described below), and detects the pressure of the intake air that flows through such a portion. The second intake temperature sensor SN7 is provided in a portion of the intake passage 30 between the supercharger 33 and the intercooler 35 and detects the temperature of the intake air that flows through such a portion. The second intake pressure sensor SN8 is provided in the surge tank 36 and detects the pressure of the intake air in the surge tank 36.

The supercharger 33 is a mechanical supercharger that mechanically cooperates with the engine body 1. A type of the supercharger 33 is not particularly specified. For example, any of known Lysholm, root-type, and centrifugal superchargers can be used as the supercharger 33.

An electromagnetic clutch 34 capable of being electrically switched between engagement and disengagement is interposed between the supercharger 33 and the engine body 1. When the electromagnetic clutch 34 is engaged, drive power is transmitted from the engine body 1 to the supercharger 33, and the supercharger 33 supercharges the intake air. Meanwhile, when the electromagnetic clutch 34 is disengaged, the transmission of the drive power is blocked, and the supercharger 33 stops supercharging the intake air.

The intake passage 30 is provided with a bypass passage 38 for bypassing the supercharger 33. The bypass passage 38 connects the surge tank 36 and the EGR passage 51, which will be described below, with each other. The bypass passage 38 is provided with an openable/closable bypass valve 39.

The exhaust passage 40 is connected to another side surface of the cylinder head 4 so as to communicate with the exhaust port 10. The burned gas that is produced in the combustion chamber 6 is discharged to the outside through the exhaust port 10 and the exhaust passage 40.

The exhaust passage 40 is provided with a catalytic converter 41. The catalytic converter 41 includes: a three-way catalyst 41a for removing toxic substances (HC, CO, NOx) contained in the exhaust gas flowing through the exhaust passage 40; and a gasoline particulate filter (GPF) 41b that catches particulate matters (PM) contained in the exhaust gas. On a downstream side of the catalytic converter 41, another catalytic converter that includes an appropriate catalyst such as a three-way catalyst or an NOx catalyst may be added.

A linear $O_2$ sensor that detects concentration of oxygen contained in the exhaust gas is provided in a portion of the exhaust passage 40 on an upstream side of the catalytic converter 41. The linear $O_2$ sensor is a type of a sensor, an output value of which is linearly changed according to a degree of the oxygen concentration, and an air-fuel ratio of the air-fuel mixture can be estimated on the basis of the output value of this linear $O_2$ sensor.

The external EGR device 50 has: the EGR passage 51 that connects the exhaust passage 40 and the intake passage 30; and an EGR cooler 52 and an EGR valve 53 provided in the EGR passage 51. The EGR passage 51 connects a portion of the exhaust passage 40 on a downstream side of the catalytic converter 41 and a portion of the intake passage 30 between the throttle valve 32 and the supercharger 33. The EGR cooler 52 cools the exhaust gas (external EGR gas) that is recirculated from the exhaust passage 40 into the intake passage 30 through the EGR passage 51 by heat exchange. The EGR valve 53 is provided to be openable/closable on a downstream side of the EGR cooler 52 (a side near the intake passage 30) in the EGR passage 51 and adjusts a flow rate of the exhaust gas flowing through the EGR passage 51. The EGR valve 53 corresponds to an example of the "temperature adjustment device" in the claims.

The EGR passage 51 is provided with a differential pressure sensor SN9 that detects a difference between a pressure on an upstream side of the EGR valve 53 and a pressure on a downstream side thereof.

(2) CONTROL SYSTEM

Figure 4:
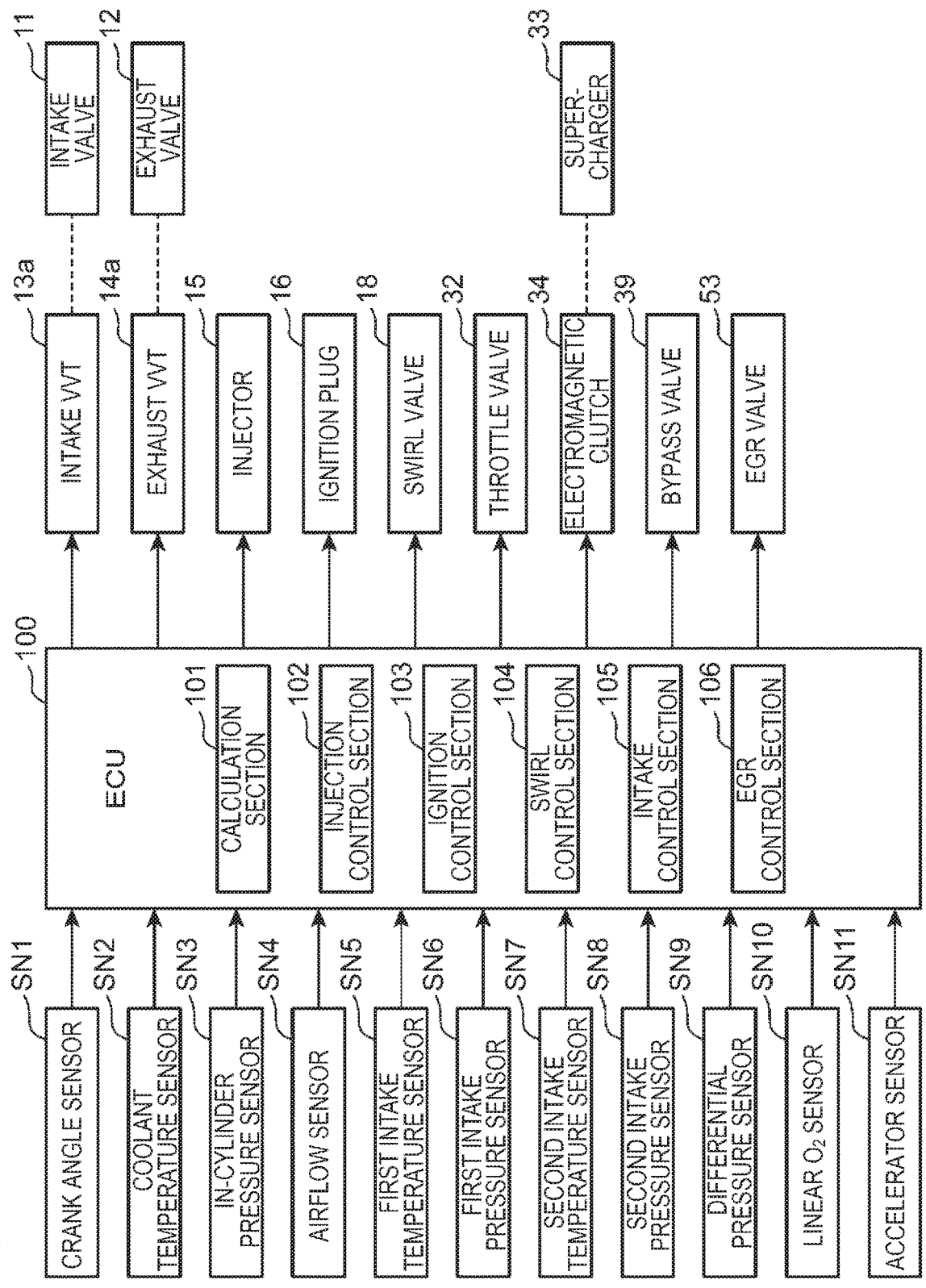
FIG. 4 is a block diagram illustrating an engine control system.

FIG. 4 is a block diagram illustrating an engine control system. An ECU 100 illustrated in the drawing is a microprocessor that integrally controls the engine, and includes an electric circuit including such as a CPU, ROM, and RAM, which are well-known. The ECU 100 corresponds to an example of the "controller" in the claims.

The ECU 100 receives detection signals from the various sensors. For example, the ECU 100 is electrically connected to the crank angle sensor SN1, the coolant temperature sensor SN2, the in-cylinder pressure sensor SN3, the airflow sensor SN4, the first and second intake temperature sensors SN5, SN7, the first and second intake pressure sensors SN6, SN8, the differential pressure sensor SN9, and the linear $O_2$ sensor SN10 described above. The ECU 100 sequentially receives information detected by these sensors (that is, the crank angle, the engine speed, the engine coolant temperature, the in-cylinder pressure, the flow rate of the intake air, the intake air temperature, the intake air pressure, the differential pressure between the upstream side and the downstream side of the EGR valve 53, the oxygen concentration of the exhaust gas, and the like).

The vehicle is also provided with an accelerator sensor SN11 that detects a pedal position of an accelerator pedal operated by a driver who drives the vehicle, and the ECU 100 also receives a detection signal from this accelerator sensor SN11.

The ECU 100 makes various determinations and calculations on the basis of the input information from the above sensors while controlling each component of the engine. That is, the ECU 100 is electrically connected to the intake VVT 13a, the exhaust VVT 14a, the injector 15, the ignition plug 16, the swirl valve 18, the throttle valve 32, the electromagnetic clutch 34, the bypass valve 39, the EGR valve 53, and the like, and outputs a control signal to each of these devices on the basis of a calculation result and the like.

More specifically, the ECU 100 functionally has a calculation section 101, an injection control section 102, an ignition control section 103, a swirl control section 104, an intake control section 105, and an EGR control section 106.

The injection control section 102 is a control module for controlling fuel injection operation by the injector 15. The ignition control section 103 is a control module for controlling ignition operation by the ignition plug 16. The swirl control section 104 is a control module for controlling an opening degree of the swirl valve 18. The intake control section 105 is a control module for adjusting the flow rate and the pressure of the intake air to be introduced into the combustion chamber 6, and controls an opening degree of each of the throttle valve 32 and the bypass valve 39 as well as ON/OFF of the electromagnetic clutch 34. The EGR control section 106 is a control module for adjusting an amount of the EGR gas (the external EGR gas and the internal EGR gas) to be introduced into the combustion chamber 6, and controls operation of each of the intake VVT 13a and the exhaust VVT 14a as well as an opening degree of the EGR valve 53. The calculation section 101 is a control module for carrying out various calculations in order to determine a control target value by each of these control sections 102 to 106 and determine an operation state of the engine, for example. The calculation section 101 corresponds to an example of the "setting section" or the "ignition timing setting section" in the claims, the ignition control section 103 corresponds to an example of the "first/second ignition control sections" in the claims, and the EGR control section 106 corresponds to an example of the "in-cylinder temperature adjustment section" in the claims.

(3) CONTROL ACCORDING TO OPERATION STATE

Figure 5:
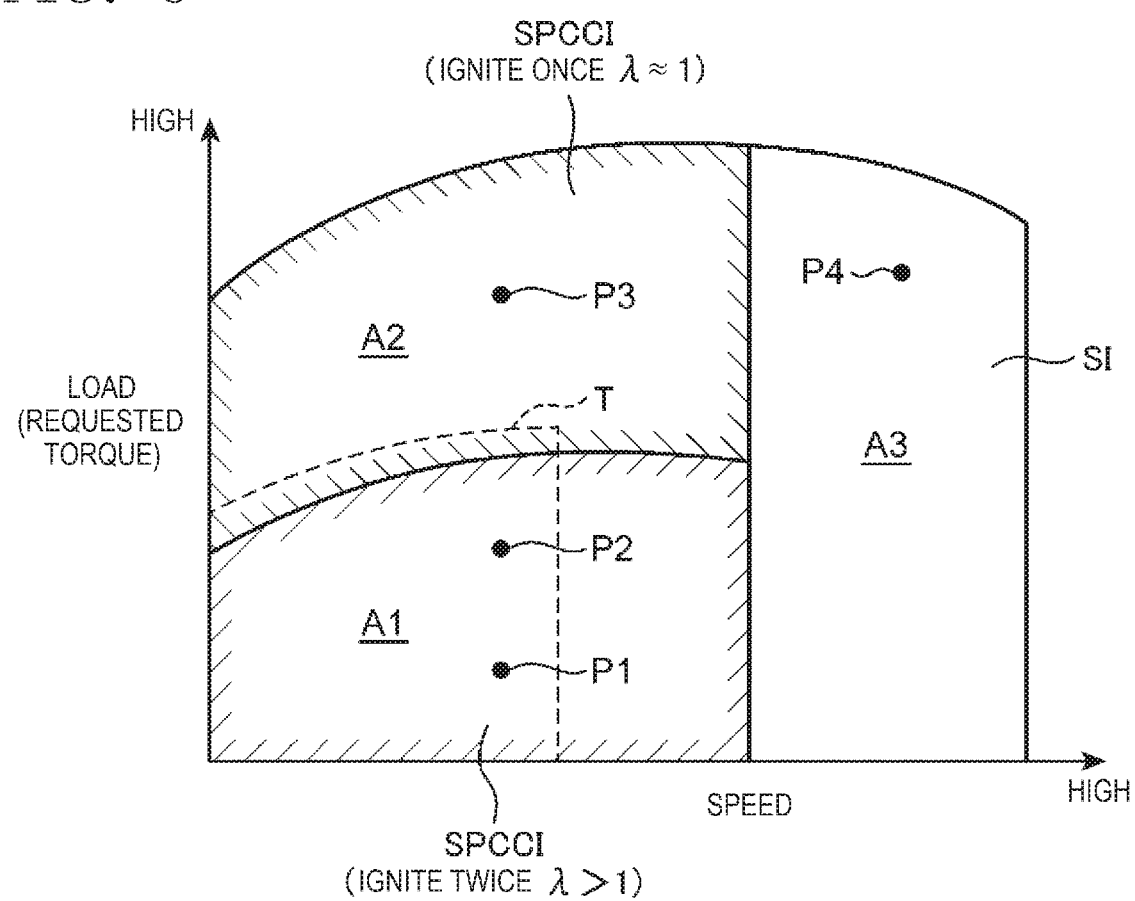
FIG. 5 is an operation map in which an engine operation range is divided according to a difference in combustion mode.

FIG. 5 is an operation map that is used in a warm period of the engine, and is a map illustrating differences in control according to the speed/load of the engine. In the following description, that the engine load is high (low) is equivalent to that requested engine torque is high (low).

As illustrated in FIG. 5, when the engine is in a warm state, an engine operation range is largely divided into three operation ranges A1 to A3 according to a difference in combustion mode. When the operation ranges are set to a first operation range A1, a second operation range A2, and a third operation range A3, the third operation range A3 is a high-speed range where the speed is high, the first operation range A1 is a low to middle-speed/low-load range where a portion on a high-load side is eliminated from a range on a low-speed side of the third operation range A3, and the second operation range A2 is a range that is the rest of the operation ranges other than the first and third operation ranges A1, A3 (in other words, a low to middle-speed/high-load range). Hereinafter, a description will sequentially be made on the combustion mode selected in each of the operation ranges, and the like.

(3-1) First Operation Range

In the low to middle-speed/low-load first operation range A1, the partial compression ignition combustion (hereinafter this will be referred to as SPCCI combustion) in which SI combustion and CI combustion are combined is carried out. The SI combustion is a combustion mode in which the air-fuel mixture is ignited by a spark generated from the ignition plug 16 and then the air-fuel mixture is forcibly burned by flame propagation that expands a combustion region from the ignited point to a surrounding area. The CI combustion is a combustion mode in which the air-fuel mixture is self-ignited under high-temperature, high-pressure environment created by the compression of the piston 5. The SPCCI combustion in which these SI combustion and CI combustion are combined is a combustion mode in which some of the air-fuel mixture in the combustion chamber 6 is subjected to the SI combustion by the spark ignition that is carried out in environment immediately before the self-ignition of the air-fuel mixture and, after the SI combustion (due to the further increases in temperature and the pressure associated with the SI combustion), the rest of the air-fuel mixture in the combustion chamber 6 is subjected to the CI combustion by the self-ignition. Here, "SPCCI" is an abbreviation for "spark controlled compression ignition".

Figure 6:
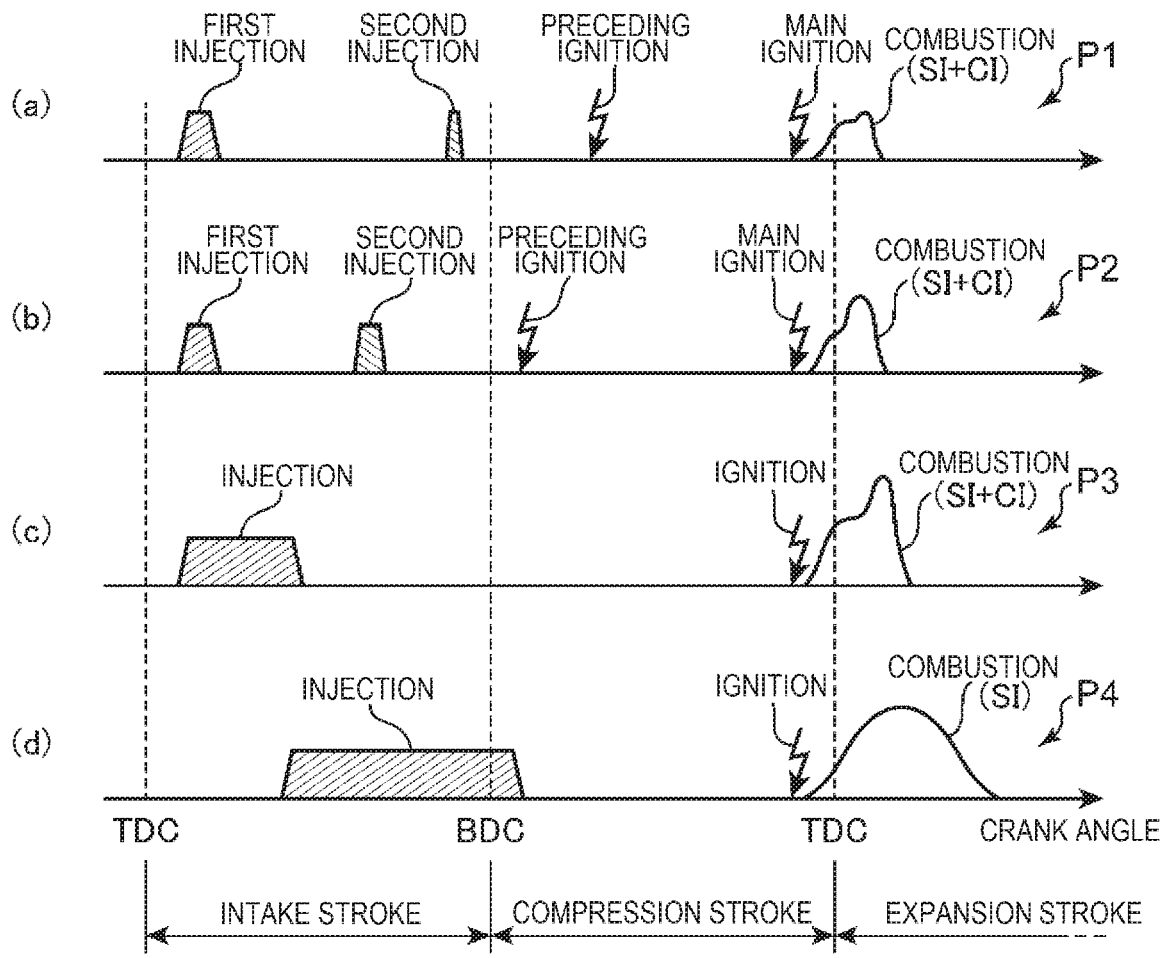
FIG. 6 includes time charts for schematically illustrating combustion control that is executed in each of the engine operation ranges.
Figure 7:
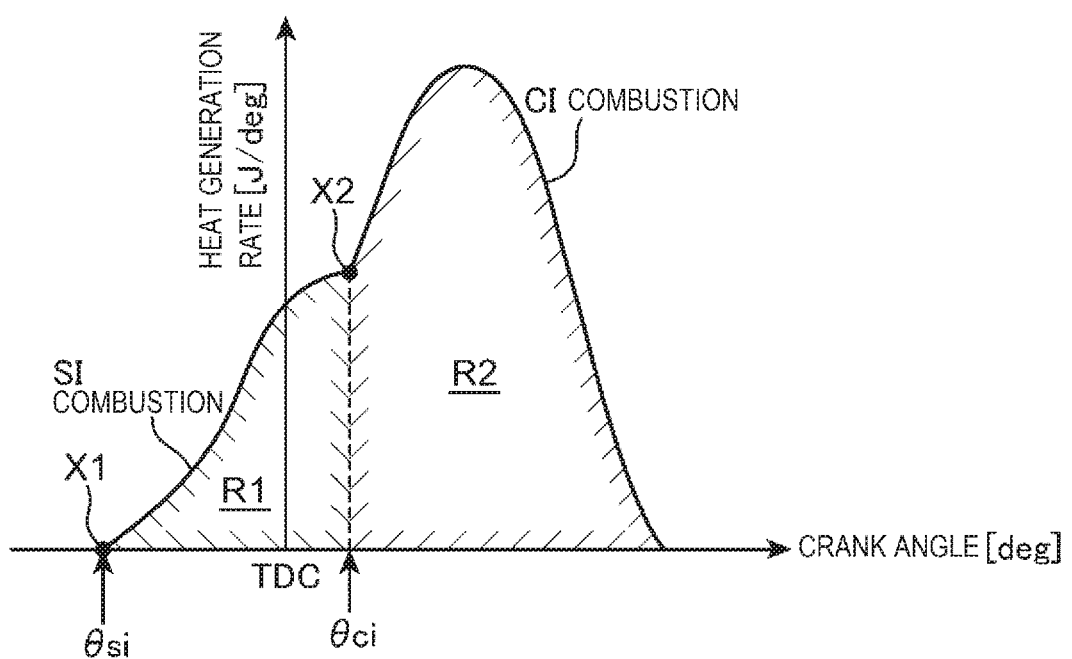
FIG. 7 is a graph illustrating a waveform of a heat generation rate during partial compression ignition combustion (SPCCI combustion).

The SPCCI combustion has such a property that the heat is more steeply generated in the CI combustion than in the SI combustion. For example, as illustrated in FIG. 6 and FIG. 7, which will be described below, in a waveform of a heat generation rate by the SPCCI combustion, a gradient at an initial rise at an initial stage of the combustion corresponding to the SI combustion is gentler than a subsequent gradient at an initial rise corresponding to the CI combustion. In other words, the waveform of the heat generation rate during the SPCCI combustion is created such that a first heat generation rate portion based on the SI combustion and having a relatively gentle gradient at an initial rise and a second heat generation portion based on the CI combustion and having a relatively steep gradient at an initial rise occur consecutively in this order. In a manner to correspond to such a tendency of the heat generation rate, in the SPCCI combustion, a pressure increasing rate (dp/dθ) in the combustion chamber 6 that is generated in the SI combustion is lower than that in the CI combustion.

When the temperature and the pressure in the combustion chamber 6 are increased by the SI combustion, the unburned air-fuel mixture is self-ignited in association therewith, and the CI combustion is initiated. As exemplified in FIG. 6 and FIG. 7, which will be described later, the gradient of the waveform of the heat generation rate is changed from being gentle to being steep at timing of this self-ignition (that is, timing at which the CI combustion is initiated). That is, the waveform of the heat generation rate in the SPCCI combustion has an inflection point (X2 in FIG. 7) that appears at the initiation timing of the CI combustion.

After the initiation of the CI combustion, the SI combustion and the CI combustion are carried out in parallel. A combustion velocity of the air-fuel mixture is higher in the CI combustion than in the SI combustion. Thus, the heat generation rate is relatively high in the CI combustion. However, the CI combustion is carried out after the piston 5 reaches the compression top dead center. Thus, the gradient of the waveform of the heat generation rate never becomes excessively steep. That is, after passing the compression top dead center, the piston 5 lowers and reduces a motoring pressure. As a result, the increase in the heat generation rate is suppressed, which avoids an excessive increase in dp/dθ in the CI combustion. Just as described, in the SPCCI combustion, due to a characteristic that the CI combustion is carried out after the SI combustion, the excessive increase in dp/dθ, which serves as an index of combustion noise, is unlikely to occur. Thus, compared to the simple CI combustion (a case where the entire fuel is subjected to the CI combustion), it is possible to suppress the combustion noise.

With termination of the CI combustion, the SPCCI combustion is also terminated. The combustion velocity is higher in the CI combustion than in the SI combustion. Thus, compared to the simple SI combustion (the case where the entire fuel is subjected to the SI combustion), combustion termination timing can be advanced. In other words, in the SPCCI combustion, in an expansion stroke, it is possible to bring the combustion termination timing closer to timing at which the piston 5 reaches the compression top dead center. In this way, the fuel consumption performance can be improved in the SPCCI combustion when compared to the simple SI combustion.

As a specific mode of the SPCCI combustion as described above, in the first operation range A1, such control is executed that the spark is generated from the ignition plug 16 for plural times and the air-fuel mixture is subjected to the SPCCI combustion at the time of the last spark ignition. In this embodiment, the number of the spark ignition is set to two. In order to carry out the SPCCI combustion with the two-time ignition, in the first operation range A1, the ECU 100 controls each of the engine components as follows. In the following description, as terms that specify timing of the fuel injection and the spark ignition, terms such as an "early period", a "middle period", and a "late period" of a certain stroke, and terms such as a "first half" and a "latter half" of the certain stroke will be used, and these terms are based on the following preconditions. That is, in the present specification, in the case where the stroke such as an intake stroke or a compression stroke is equally divided into three, periods are defined as the "early period", the "middle period", and the "late period" in time sequence. Thus, for example, (i) the early period, (ii) the middle period, and (iii) the late period of the compression stroke respectively indicate ranges of (i) before compression top dead center (BTDC) 180 to 120° CA, (ii) BTDC 120 to 60° CA, and (iii) BTDC 60 to 0° CA. Similarly, in the present specification, in the case where the stroke such as the intake stroke or the compression stroke is equally divided into two, periods are defined as the "first half" and the "latter half" in time sequence. Thus, for example, (iv) the first half and (v) the latter half of the intake stroke respectively indicate ranges of (iv) the BTDC 360 to 270° CA and (v) BTDC 270 to 180° CA.

During the operation in the first operation range A1, the ignition plug 16 carries out preceding ignition and main ignition. In the preceding ignition, the ignition plug 16 generates the spark at timing that is sufficiently advanced from the compression top dead center. In the main ignition, the ignition plug 16 generates the spark at closer timing to the compression top dead center than the preceding ignition. The preceding ignition is carried out in any of the early period or the middle period of the compression stroke (BTDC 180 to 60° CA). The main ignition is carried out in a period from the late period of the compression stroke to an initial period of the expansion stroke (BTDC 60 to ATDC 60° CA).

For example, at an operation point P1 on the low-load side in the first operation range A1, as illustrated in Chart (a) in FIG. 6, the ignition plug 16 carries out the preceding ignition in the early period of the compression stroke and carries out the main ignition in the late period of the compression stroke. Similarly, at an operation point P2 with the higher load than the operation point P1, as illustrated in Chart (b) in FIG. 6, the ignition plug 16 carries out the preceding ignition in the early period of the compression stroke and carries out the main ignition in the late period of the compression stroke. However, the timing of the preceding ignition at the operation point P2 on the high-load side is set to be advanced from the timing of the preceding ignition at the operation point P1 on the low-load side. This is linked to timing of second injection (the last fuel injection in one cycle), which will be described below. That is, the timing of the preceding ignition is more advanced on the higher-load side in a manner to be linked to the timing of the second injection such that a crank angle period from the second injection to the preceding ignition is maintained to be substantially constant.

In the preceding ignition carried out at the timing that is substantially advanced from the compression top dead center as described above, the flame propagation of the air-fuel mixture does not occur. Although details will be described below, this preceding ignition is carried out for a purpose of producing an intermediate product containing OH radicals. The intermediate product is produced when the temperature of the air-fuel mixture around the spark (an arc) is increased to a target temperature that is equal to or higher than 850 K and lower than 1140 K and the fuel component (hydrocarbons) is thereby cleaved. In addition, in order to reliably prevent the flame propagation, energy of the preceding ignition is set to be lower than energy of the main ignition. Accordingly, even when such preceding ignition is carried out, the air-fuel mixture is not substantially flamed, and the SI combustion is not initiated.

Meanwhile, the main ignition with the high energy that is carried out at the timing relatively close to the compression top dead center causes the flame propagation of the air-fuel mixture and causes the SI combustion. When the SI combustion is initiated, the temperature and the pressure of the combustion chamber 6 are increased, which causes the CI combustion. That is, the main ignition triggers the SPCCI combustion, some of the air-fuel mixture in the combustion chamber 6 is burned by the flame propagation (the SI combustion), and the rest of the air-fuel mixture is burned by the self-ignition (the CI combustion).

The injector 15 injects the fuel to be injected in one cycle in plural parts, and injects at least some of the fuel during the intake stroke. In this embodiment, the number of the fuel injection is set to two. That is, during the operation in the first operation range A1, in a specified earlier period than the above-described preceding ignition, the injector 15 injects the fuel by dividing the fuel for first injection and the second injection. For example, at the operation point P1 on the low-load side in the first operation range A1, as illustrated in Chart (a) in FIG. 6, the injector 15 initiates the first injection in the first half of the intake stroke, and initiates the second injection in the latter half of the intake stroke. Similarly, at the operation point P2 with the higher load than the operation point P1, as illustrated in Chart (b) in FIG. 6, the injector 15 initiates the first injection in the first half of the intake stroke, and initiates the second injection in the latter half of the intake stroke. However, initiation timing of the second injection at the operation point P2 on the high-load side is set to be advanced from initiation timing of the second injection at the operation point P1 on the low-load side. In other words, the timing of the second injection is advanced with an increase in the load in the first operation range A1.

An amount (a total amount) and a split ratio of the fuel that is injected from the injector 15 by split injection as described above are set to be variable according to the requested engine torque. More specifically, the total amount of the fuel, that is, a sum of a fuel injection amount by the first injection and a fuel injection amount by the second injection is set to be increased on the higher-load side with the increased requested torque. More specifically, the split ratio between the first/second injections, that is, (the fuel injection amount by the first injection):(the fuel injection amount by the second) is set to have the smaller ratio of the first injection on the higher-load side. For example, the split ratio between the first and second injections is set to be changed from approximately 9:1 to 6:4 from the low-load side to the high-load side in the first operation range A1.

The opening degree of the throttle valve 32 is set to such an opening degree that a larger amount of the air than an amount of the air at the stoichiometric air-fuel ratio is introduced into the combustion chamber 6 through the intake passage 30. That is, the opening degree of the throttle valve 32 is set to be relatively large so that the air-fuel ratio (A/F) as a weight ratio between the air (the fresh air) introduced into the combustion chamber 6 through the intake passage 30 and the fuel injected into the combustion chamber 6 by the first and second injections becomes higher than the stoichiometric air-fuel ratio (14.7). Then, the larger amount of the air than the amount of the air at the stoichiometric air-fuel ratio is introduced into the combustion chamber 6 through the intake passage 30. Just as described, in this embodiment, during the operation in the first operation range A1, control to create such environment that the air-fuel ratio in the combustion chamber 6 is higher than the stoichiometric air-fuel ratio (hereinafter this will be referred to as lean A/F environment) while subjecting the air-fuel mixture to the SPCCI combustion is executed.

Figure 8:
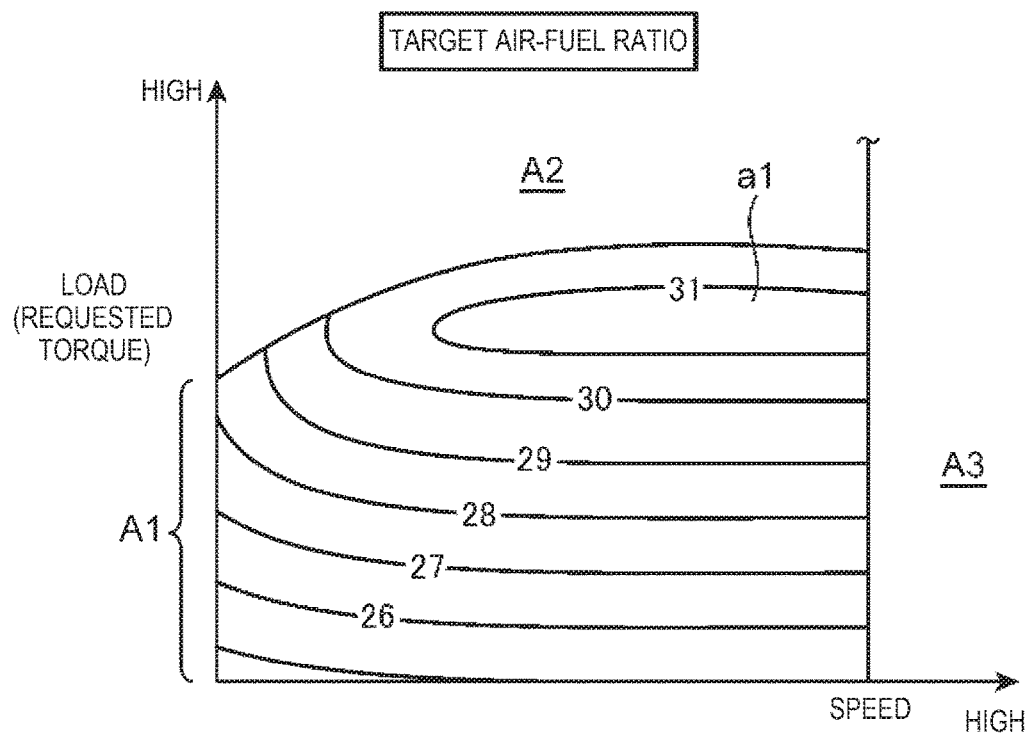
FIG. 8 is a map illustrating a specific example of a target air-fuel ratio that is set in a first operation range of the engine.

The air-fuel ratio (A/F) in the first operation range A1 is set to be variable within a range that is higher than 20 and lower than 35. FIG. 8 is a map illustrating a setting example of a target air-fuel ratio that is a target value of the air-fuel ratio (A/F) in the first operation range A1. As illustrated in this map, the target air-fuel ratio in the first operation range A1 is set to be substantially increased with the increase in the load (the requested torque) in the first operation range A1. In detail, the target air-fuel ratio is set to have the highest value (equal to or higher than 31) in a range a1 that is set near an upper limit load in the first operation range A1 (that is, a load on a boundary between the first operation range A1 and the second operation range A2) and to have a lower value as being separated from such a range a1. However, the air-fuel ratio never becomes equal to or lower than 20 at any position in the first operation range A1. In this embodiment, the range a1 with the maximum target air-fuel ratio is set to a belt-like range that is separated from the upper limit load of the first operation range A1 to the slightly low-load side and is separated from the lower limit speed of the first operation range A1 to the high-speed side, that is, a middle to high-speed/high-load range in the first operation range A1. Since the range a1 is located near the upper limit load, an idle range with the lowest speed and load is the farthest from the range a1 in the first operation range A1. The target air-fuel ratio in this idle range is the lowest.

In an inner range of a supercharging line T illustrated in FIG. 5, the supercharger 33 is brought into an OFF state. In an outer range of the supercharging line T, the supercharger 33 is brought into an ON state. In the inner range of the supercharging line T where the supercharger 33 is brought into the OFF state, that is, in a low-speed portion of the first operation range A1, the electromagnetic clutch 34 is disengaged, and the supercharger 33 and the engine body 1 are decoupled. In addition, the bypass valve 39 is fully opened. In this way, the supercharger 33 stops supercharging the intake air. Meanwhile, in the outer range of the supercharging line T where the supercharger 33 is brought into the ON state, that is, in a high-speed portion of the first operation range A1, the electromagnetic clutch 34 is engaged, and the supercharger 33 and the engine body 1 are coupled. In this way, the supercharger 33 supercharges the intake air. At this time, the opening degree of the bypass valve 39 is controlled such that the pressure (a supercharging pressure) in the surge tank 36, which is detected by the second intake pressure sensor SN8, matches a predetermined target pressure per engine operation condition (conditions such as the speed and the load). For example, as the opening degree of the bypass valve 39 is increased, the flow rate of the intake air that flows reversely to the upstream side of the supercharger 33 through the bypass passage 38 is increased. As a result, the pressure of the intake air that is introduced into the surge tank 36, that is, the supercharging pressure is reduced. The bypass valve 39 adjusts a reverse flow rate of the intake air, just as described, and thereby controls the supercharging pressure to the target pressure.

In order to bring the temperature of the combustion chamber 6 (hereinafter also referred to as the in-cylinder temperature) to a temperature suited for the SPCCI combustion, in many ranges in the first operation range A1, the intake VVT 13a and the exhaust VVT 14a respectively drive the intake valves 11 and the exhaust valves 12 at such timing that internal EGR for leaving the burned gas in the combustion chamber 6 can be carried out. That is, the intake/exhaust VVTs 13a, 14a drive the valves 11, 12 to generate the valve overlapping period in which both of the intake/exhaust valves 11, 12 are opened across the exhaust top dead center, and keep opening the exhaust valves 12 until the piston 5 passes the exhaust top dead center (until an initial period of the intake stroke). In this way, the burned gas returns to the combustion chamber 6 from the exhaust port 10, and the internal EGR thereby occurs. The valve overlapping period is adjusted to achieve the in-cylinder temperature that is suited to acquire the desired waveform of the SPCCI combustion (a target SI rate and a target θCi, which will be described below), in other words, to introduce an amount of the internal EGR gas that is required to achieve such a temperature into the combustion chamber 6. An internal EGR rate that is acquired by adjusting the valve overlapping period just as described, that is, a proportion of the internal EGR gas to a total gas amount in the combustion chamber 6 generally tends to be increased on the lower-load side in the first operation range A1.

The EGR valve 53 is opened in many ranges in the first operation range A1 so as to achieve the in-cylinder temperature suited for the SPCCI combustion. That is, the EGR valve 53 is opened to cause external EGR in which the exhaust gas is recirculated into the combustion chamber 6 through the EGR passage 51. Although details will be described below, the opening degree of the EGR valve 53 is adjusted to achieve the in-cylinder temperature that is suited to acquire the desired waveform of the SPCCI combustion (the target SI rate and the target θCi, which will be described below), in other words, to introduce an amount of the external EGR gas that is required to achieve such a temperature into the combustion chamber 6. An external EGR rate that is acquired by adjusting the opening degree of the EGR valve 53 just as described, that is, a proportion of the external EGR gas to the total gas amount in the combustion chamber 6 generally tends to be increased with the increase in the speed or the load in the first operation range A1.

The opening degree of the swirl valve 18 is set to a lower opening degree than a half-opening degree (50%). When the opening degree of the swirl valve 18 is reduced just as described, a large portion of the intake air that is introduced into the combustion chamber 6 is the intake air from the first intake port 9A (the intake port on a side where the swirl valve 18 is not provided), and the strong swirl flow is generated in the combustion chamber 6. This swirl flow is intensified in the intake stroke, remains until the middle of the compression stroke, and promotes stratification of the fuel. That is, such a concentration difference occurs that the concentration of the fuel in a central portion of the combustion chamber 6 is higher than that in an outer area (an outer circumferential portion) thereof. A detailed description on specific setting of the opening degree of the swirl valve 18 will be made in (4) below.

(3-2) Second Operation Range

In the low to middle-speed/high-load second operation range A2, such control is executed to subject the air-fuel mixture to the SPCCI combustion by one time of the spark ignition. In other words, in the second operation range A2, the preceding ignition in the above-described first operation range A1 is eliminated, and only the main ignition is carried out. In order to carry out the SPCCI combustion with the one-time ignition, in the second operation range A2, each of the components of the engine is controlled by the ECU 100 as follows.

The ignition plug 16 carries out the spark ignition once in the period from the late period of the compression stroke to the initial period of the expansion stroke. For example, at an operation point P3 in the second operation range A2, as illustrated in Chart (c) in FIG. 6, the ignition plug 16 carries out the spark ignition once in the late period of the compression stroke. Then, this spark ignition triggers the SPCCI combustion, some of the air-fuel mixture in the combustion chamber 6 is burned by the flame propagation (the SI combustion), and the rest of the air-fuel mixture is burned by the self-ignition (the CI combustion).

The injector 15 injects the fuel at least once in the intake stroke. For example, at the operation point P3 in the second operation range A2, as illustrated in Chart (c) in FIG. 6, the injector 15 carries out the single fuel injection during the intake stroke so as to supply an entire amount of the fuel to be injected in one cycle. In the range other than the operation point P3 (for example, at an operation point on the lower-load side than the operation point P3 in the second operation range A2), the fuel may be injected in two parts in the intake stroke.

The opening degree of the throttle valve 32 is set to such an opening degree that the air amount corresponding to the stoichiometric air-fuel ratio is introduced into the combustion chamber 6 through the intake passage 30, that is, the air-fuel ratio (A/F) as the weight ratio between the air (the fresh air) and the fuel in the combustion chamber 6 substantially matches the stoichiometric air-fuel ratio (14.7). Meanwhile, as will be described below, in the second operation range A2, the EGR valve 53 is opened, and the external EGR gas is introduced into the combustion chamber 6. Accordingly, in the second operation range A2, a gas air-fuel ratio (G/F) as a weight ratio between the whole gas and the fuel in the combustion chamber 6 is higher than the stoichiometric air-fuel ratio (14.7). Just as described, in this embodiment, during the operation in the second operation range A2, control to create such environment that the gas air-fuel ratio (G/F) is higher than the stoichiometric air-fuel ratio and the air-fuel ratio (A/F) substantially matches the stoichiometric air-fuel ratio (hereinafter this will be referred to as lean G/F environment) while subjecting the air-fuel mixture to the SPCCI combustion is executed.

The supercharger 33 is in the OFF state in a portion on the low-load and low-speed side that overlaps the inner range of the supercharging line T, and is in the ON state in the other ranges. When the supercharger 33 is in the ON state and the intake air is supercharged, the opening degree of the bypass valve 39 is controlled such that the pressure in the surge tank 36 (the supercharging pressure) matches the target pressure.

The intake VVT 13a and the exhaust VVT 14a respectively drive the intake valves 11 and the exhaust valves 12 at such timing that the internal EGR is substantially stopped.

The EGR valve 53 is opened to the appropriate opening degree such that an amount of the external EGR gas suited for the SPCCI combustion in the second operation range A2 is introduced into the combustion chamber 6. Similar to the case of the above-described first operation range A1, the opening degree of the EGR valve 53 at this time is adjusted to achieve the in-cylinder temperature that is suited to acquire the desired waveform of the SPCCI combustion (the target SI rate and the target θCi, which will be described below).

The opening degree of the swirl valve 18 is set to a value that is substantially equal to the opening degree thereof in the first operation range A1 or to a specified intermediate opening degree that is larger than the opening degree thereof in the first operation range A1.

(3-3) Third Operation Range

In the third operation range A3 on the high-speed side from the first and second operation ranges A1, A2 described above, the relatively orthodox SI combustion is carried out. In order to carry out this SI combustion, in the third operation range A3, each of the components of the engine is controlled by the ECU 100 as follows.

The ignition plug 16 carries out the spark ignition once in the period from the late period of the compression stroke to the initial period of the expansion stroke. For example, at an operation point P4 in the third operation range A3, as illustrated in Chart (d) in FIG. 6, the ignition plug 16 carries out the spark ignition once in the late period of the compression stroke. Then, this spark ignition triggers the SI combustion, and the entire air-fuel mixture in the combustion chamber 6 is burned by the flame propagation.

The injector 15 injects the fuel for a specified period that at least overlaps the intake stroke. For example, at the operation point P4, as illustrated in Chart (d) in FIG. 6, the injector 15 injects the fuel for a succession of periods from the intake stroke to the compression stroke. The quite high-speed and high-load conditions are set at the operation point P4. Thus, the amount of the fuel to be injected in one cycle is large, and the crank angle period that is required to inject the required amount of the fuel is extended. This is why the fuel injection period at the operation point P4 is longer than the fuel injection period at each of the other operation points (P1 to P3) that has already been described.

The supercharger 33 is in the ON state, and the supercharger 33 supercharges the intake air. The supercharging pressure at this time is adjusted by the bypass valve 39.

The opening degree of each of the throttle valve 32 and the EGR valve 53 is controlled such that the air-fuel ratio (A/F) in the combustion chamber 6 becomes the stoichiometric air-fuel ratio or has a slightly richer value ($\lambda \leq 1$) than the stoichiometric air-fuel ratio.

The swirl valve 18 is fully opened. In this way, not only the first intake port 9A but also the second intake port 9B is completely opened, and engine charging efficiency is improved.

(4) SWIRL CONTROL

Figure 9:
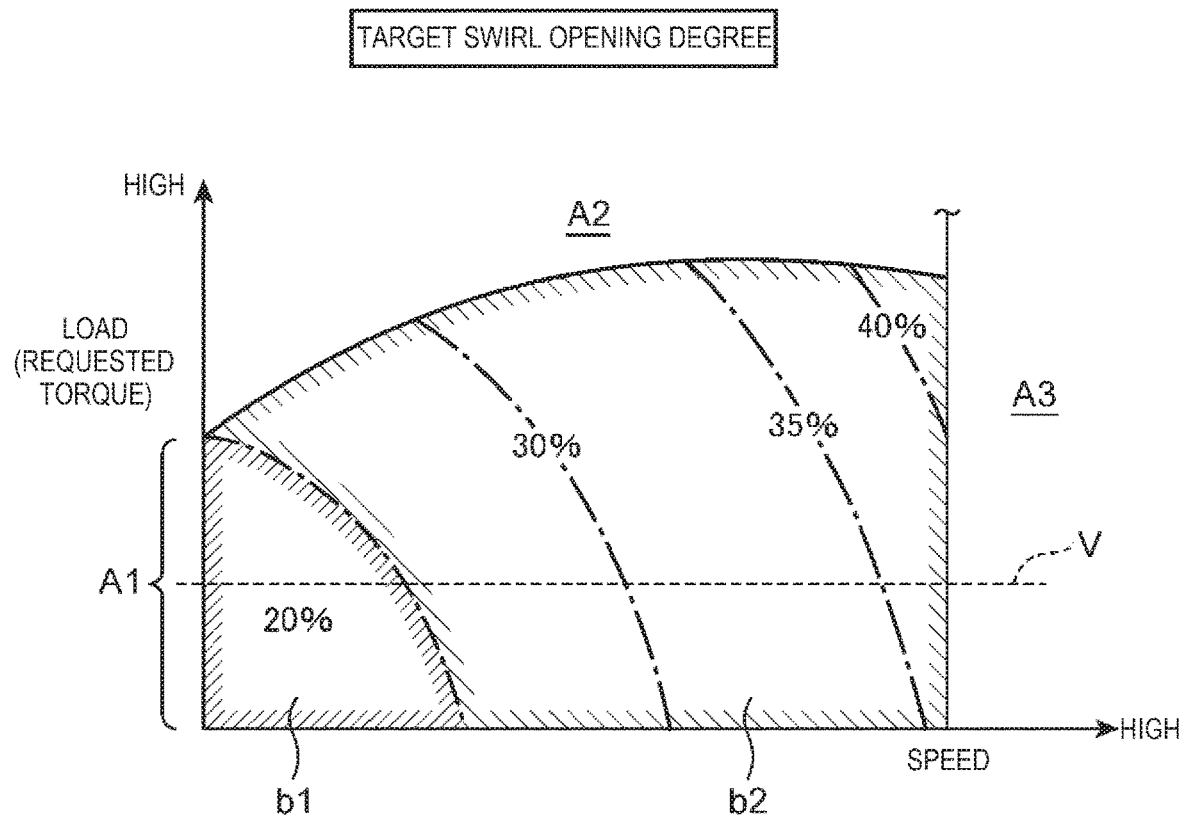
FIG. 9 is a map illustrating a specific example of a target swirl opening degree that is set in the first operation range.
Figure 10:
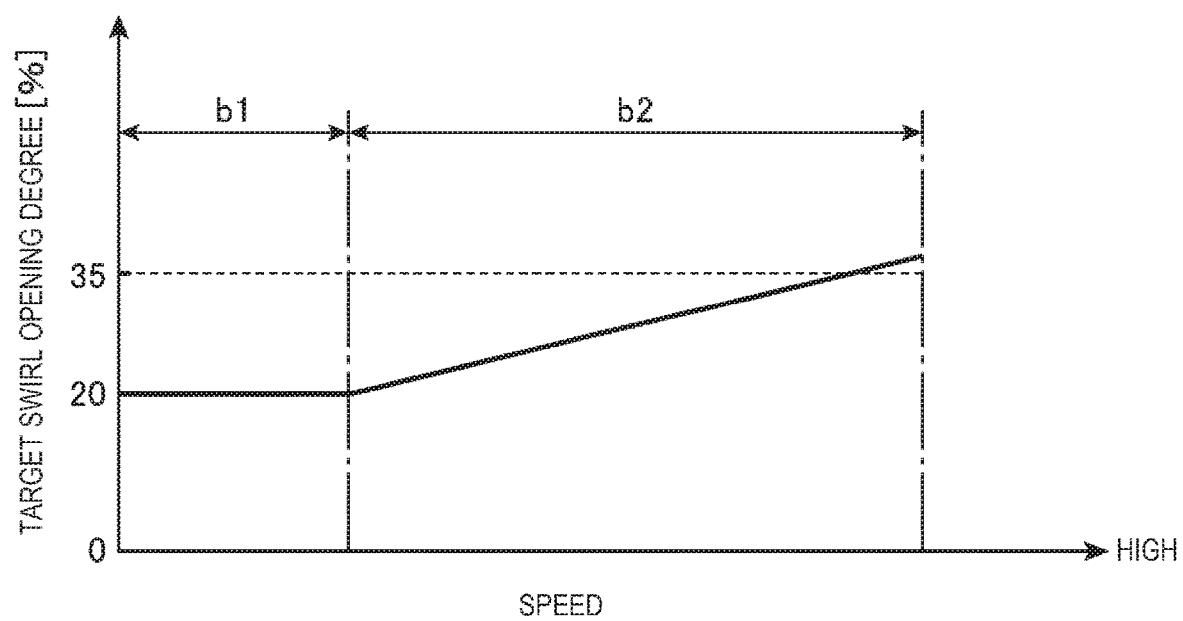
FIG. 10 is a graph illustrating a change in the target swirl opening degree in the case where a speed is changed under a condition that a load remains constant.

Next, a detailed description will be made on swirl control in the first operation range A1. FIG. 9 is a map illustrating a specific example of a target value of the opening degree of the swirl valve 18 (hereinafter also referred to as a target swirl opening degree) that is set in the first operation range A1. FIG. 10 is a graph illustrating a change in the target swirl opening degree in the case where the speed is changed (along a line V in FIG. 9) under a condition that the load remains constant. As illustrated in these drawings, in the first operation range A1, the target swirl opening degree is set to be variable within a range approximately between 20 to 40%, and a value thereof is increased on the higher-speed side or the higher-load side.

More specifically, in a first range b1 at the lowest speed and with the lowest load in the first operation range A1, the target swirl opening degree is uniformly set to 20%. In a second range b2 at the higher speed or with the higher load than this first range b1, the target swirl opening degree is set to be gradually increased with the increase in the speed or the load. In the second range b2, the target swirl opening degree approximates 20% on the lower-speed/lower-load side near the first range b1, the target swirl opening degree becomes higher than 20% on the higher-speed/higher-load side away from the first range b1, and the target swirl opening degree is increased up to approximately 40% at the maximum. For example, in the case where the speed is increased in a manner to sequentially cross the first range b1→the second range b2 (along the line V in FIG. 9), as illustrated in FIG. 10, the target swirl opening degree is maintained at 20% while the speed is positioned in the first range b1. Thereafter, after the range is shifted to the second range b2, the target swirl opening degree is increased at a substantially constant rate with the increase in the speed.

During the operation in the first operation range A1, the ECU 100 (the swirl control section 104) controls the opening degree of the swirl valve 18 according to the maps (FIG. 9 and FIG. 10) for the target swirl opening degree that is set as described above.

As the opening degree of the swirl valve 18 is reduced, the stronger swirl flow is generated in the combustion chamber 6. In this embodiment in which the maps in FIG. 9 and FIG. 10 are used, during the operation in the first operation range A1, the opening degree of the swirl valve 18 is reduced with the reductions in the speed and the load. Thus, the swirl flow is intensified according thereto (with the reductions in the speed and the load). This is to promote the stratification of the air-fuel mixture and improve ignitability under a low-speed and low-load conditions with difficulty in ignition.

That is, in this embodiment, the fuel is radially injected from the injector 15, which is arranged in the center portion of the ceiling surface of the combustion chamber 6, and each of the sprays of the injected fuel is carried by the swirl flow and moves toward a central portion of the combustion chamber 6. At this time, as the opening degree of the swirl valve 18 is reduced (in other words, as an initial speed of the swirl flow is increased), the swirl flow remains until a late stage of the compression stroke. As a result, the air-fuel mixture with the high concentration of the fuel is produced in the central portion of the combustion chamber 6 right up until the initiation of the combustion, which promotes the stratification of the air-fuel mixture. Based on such a fact, in this embodiment, the opening degree of the swirl valve 18 is reduced to intensify the swirl flow under a condition of the low speed and the low load in the first operation range A1. In this way, the air-fuel mixture is stratified, and the ignitability thereof is improved.

Figure 11:
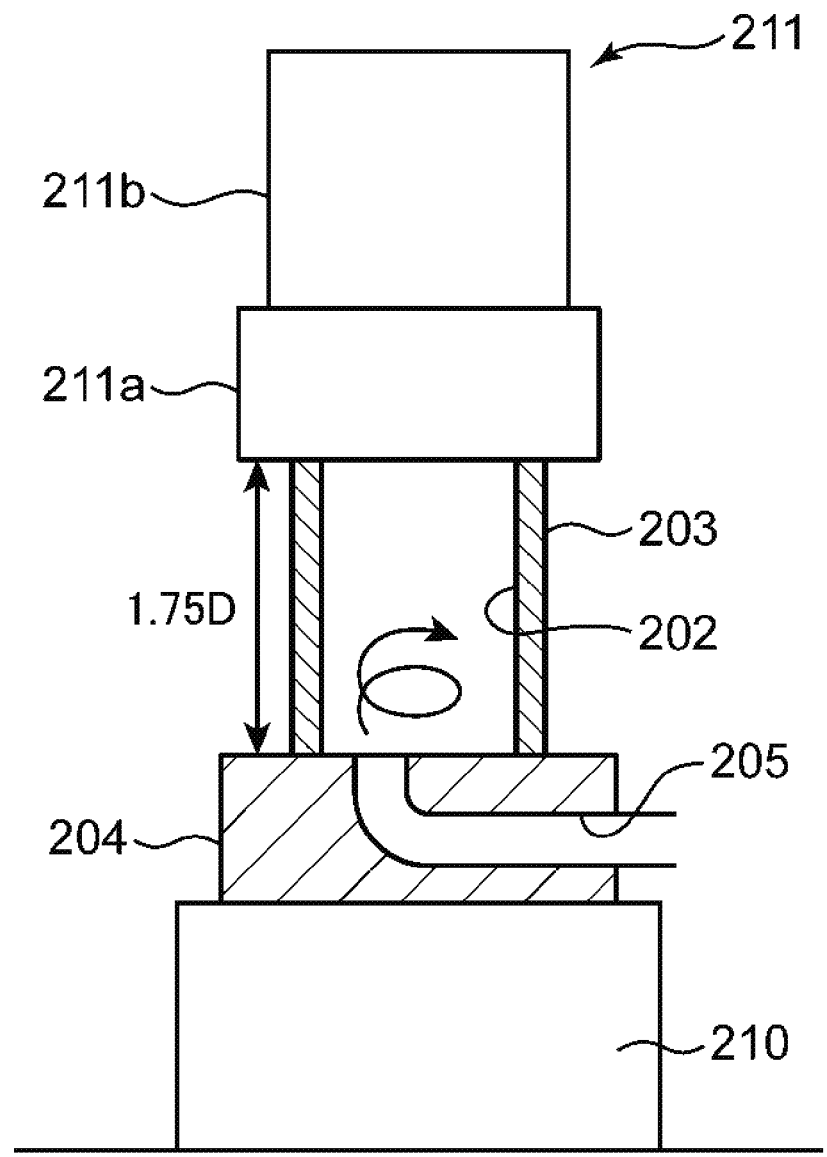
FIG. 11 is a view illustrating an outline of a rig tester that measures a swirl ratio.

Here, the strength of the swirl flow will be defined. In the present specification, the strength of the swirl flow that is generated in the combustion chamber 6 will be expressed as a "swirl ratio". The swirl ratio is defined as a value that is acquired by measuring a lateral angular velocity of an intake air flow per valve lifting, integrating the measured values, and dividing the integral value by an angular velocity of the crankshaft. The lateral angular velocity of the intake air flow can be specified by measurement using a rig tester illustrated in FIG. 11. The rig tester illustrated in this drawing measures the lateral angular velocity of the intake air flow of a test engine that includes a cylinder block 203 and a cylinder head 204, and has: a base table 210 arranged under the test engine; and an impulse meter 211 arranged on the test engine. The test engine has a vertically flipped posture, and the cylinder head 204 thereof is placed on the base table 210. An intake port 205 is formed in the cylinder head 204, and an intake supplier, which is not illustrated, is connected to this intake port 205. A cylinder 202 is formed in the cylinder block 203, and the intake air that is supplied from the intake supplier is introduced into the cylinder 202 via the intake port 205.

The impulse meter 211 has: a honey-comb rotor 211a that is attached to an upper surface of the cylinder block 203; and a meter body 211b located on the honey-comb rotor 211a. When a cylinder bore diameter that is a diameter of the cylinder 202 is set as D, a lower surface of the impulse meter 211 is located at a position that is away from a mating surface between the cylinder head 204 and the cylinder block 203 by 1.75D. When the intake air is supplied from the intake supplier, the swirl flow (see an arrow in FIG. 11) is generated in the cylinder 202 in response thereto, and this swirl flow acts on the honey-comb rotor 211a. In this way, torque in a rotational direction is generated in the honey-comb rotor 211a. This torque is measured by the meter body 211b, and the lateral angular velocity of the intake air flow is calculated on the basis of the measured torque.

Figure 12:
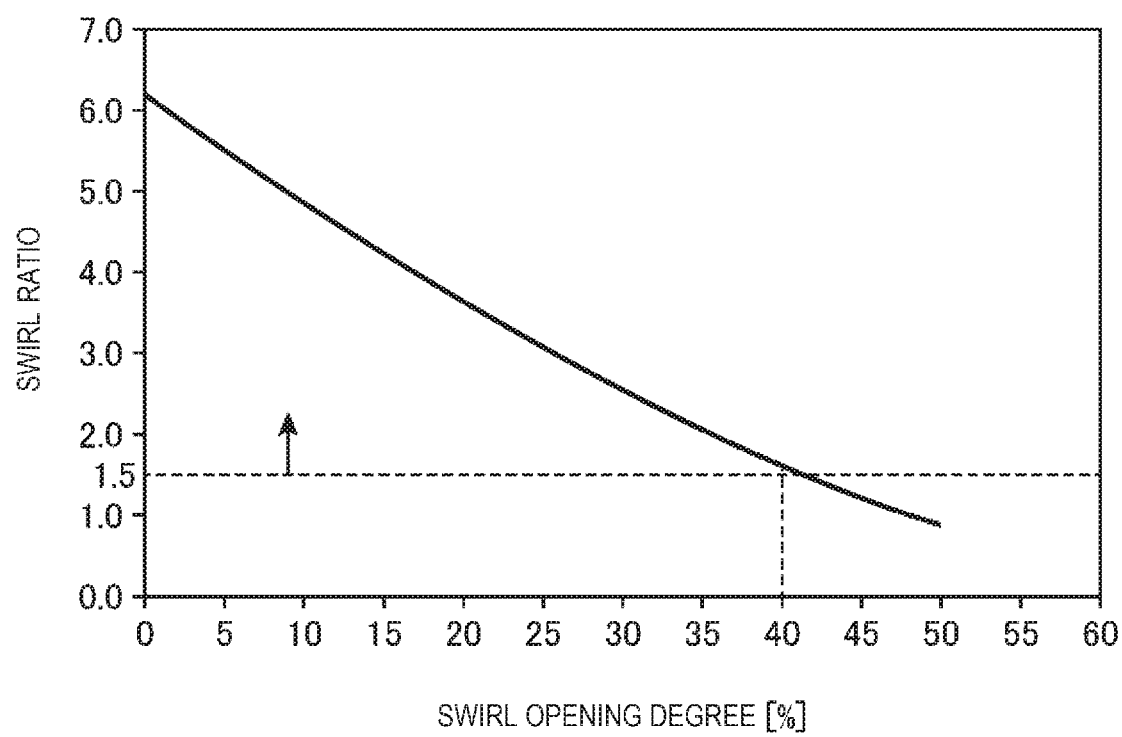
FIG. 12 is a graph illustrating a relationship between a swirl opening degree and the swirl ratio.

FIG. 12 illustrates a relationship between the opening degree of the swirl valve 18 in the engine of this embodiment and the swirl ratio that is defined as described above. As illustrated in the drawing, the swirl ratio is increased (that is, the swirl flow is intensified) with a reduction in the opening degree of the swirl valve 18. For example, when the opening degree of the swirl valve 18 is 40%, the swirl ratio has a value that slightly exceeds 1.5. Meanwhile, when the swirl valve 18 is fully closed (0%), the swirl ratio is increased to approximately 6.

Here, in this embodiment, as described above, during the operation in the first operation range A1, the opening degree of the swirl valve 18 is controlled within the range approximately between 20 to 40% (see FIG. 9 and FIG. 10). It can be said from this that, in this embodiment, the opening degree of the swirl valve 18 in the first operation range A1 is set to such a value that the swirl ratio in the combustion chamber 6 becomes equal to or higher than 1.5.

(5) REGARDING SI RATE

As described above, in this embodiment, the SPCCI combustion, in which the SI combustion and the CI combustion are combined, is carried out in the first operation range A1 and the second operation range A2. In this SPCCI combustion, it is important to control a ratio between the SI combustion and the CI combustion according to the operating conditions.

Here, in this embodiment, as the above ratio, the SI rate that is a ratio of a heat generation amount by the SI combustion to a total heat generation amount by the SPCCI combustion (the SI combustion and the CI combustion). FIG. 7 is a graph for illustrating this SI rate and illustrates a change in a heat generation rate (J/deg) by the crank angle at the time when the SPCCI combustion occurs. A point X1 on the waveform in FIG. 7 is a heat generation point at which the heat generation rate rises in conjunction with the initiation of the SI combustion, and a crank angle θSi corresponding to this heat generation point X1 is defined as initiation timing of the SI combustion. A point X2 on the same waveform is an inflection point that appears when the combustion mode is switched from the SI combustion to the CI combustion, and the crank angle θCi corresponding to this inflection point X2 is defined as initiation timing of the CI combustion. In addition, an area R1 of the waveform of the heat generation rate that is located on an advanced side (between θSi and θCi) of θCi as the initiation timing of this CI combustion is set as the heat generation amount by the SI combustion, and an area R2 of the waveform of the heat generation rate that is located on a retarded side of θCi is set as the heat generation rate by the CI combustion. In this way, the above-described SI rate, which is defined by (the heat generation amount by the SI combustion)/(the heat generation amount by the SPCCI combustion), can be expressed as R1/(R1+R2) by using the areas R1, R2. That is, in this embodiment, the SI rate=R1/(R1+R2).

In the CI combustion, the air-fuel mixture is simultaneously and frequently burned by the self-ignition. Accordingly, the pressure increasing rate tends to be higher in the CI combustion than in the SI combustion by the flame propagation. Thus, in particular, in the case where the SI rate is reduced carelessly (that is, the ratio of the CI combustion is increased) under a condition that the load is high and the fuel injection amount is large, large noise is produced. Meanwhile, the CI combustion does not occur until the temperature and the pressure of the combustion chamber 6 are sufficiently increased. Thus, under a condition that the load is low and the fuel injection amount is small, the CI combustion is not initiated until the SI combustion progresses to the certain extent, and the SI rate is inevitably increased (that is, the ratio of the CI combustion is increased). In consideration of such a circumstance, in this embodiment, in the operation range where the SPCCI combustion is carried out (that is, the first and second operation ranges A1, A2), the target SI rate as a target value of the SI rate is predetermined per engine operation condition. More specifically, in the first operation range A1 on the low-load side, the target SI rate is set to be generally reduced with the increase in the load (that is, the ratio of the CI combustion is increased with the increase in the load). Meanwhile, the target SI rate in the second operation range A2 on the high-load side is set to be generally increased (that is, the ratio of the CI combustion is reduced) with the increase in the load. Furthermore, in association therewith, in this embodiment, the target θCi, which is the initiation timing of the CI combustion in the case where the combustion compatible with the target SI rate is carried out, is also predetermined per engine operation condition.

In order to obtain the target SI rate and the target θCi described above, it is necessary to adjust control amounts such as the timing of the main ignition by the ignition plug 16, the injection amount/the injection timing of the fuel from the injector 15, the EGR rates (the external EGR rate and the internal EGR rate) per operating condition. For example, as the timing of the main ignition is advanced, the larger amount of the fuel is burned by the SI combustion, which increases the SI rate. In addition, as the fuel injection timing is advanced, the larger amount of the fuel is burned by the CI combustion, which reduces the SI rate. Alternatively, as the in-cylinder temperature is increased with an increase in the EGR rate, the larger amount of the fuel is burned by the CI combustion, which reduces the SI rate. Furthermore, the change in the SI rate is accompanied by a change in θCi. Thus, a change in each of these control amounts (the main ignition timing, the injection timing, the EGR rate, and the like) serves as an element used for adjustment of θCi.

Based on the tendencies as described above, in this embodiment, the main ignition timing, the injection amount/ the injection timing of the fuel, the EGR rate (and thus the in-cylinder temperature), and the like are controlled to make a combination capable of obtaining the target SI rate and the target θCi described above at the time when the SPCCI combustion is carried out.

(6) CONTROL DURING SPCCI COMBUSTION

Figure 13:
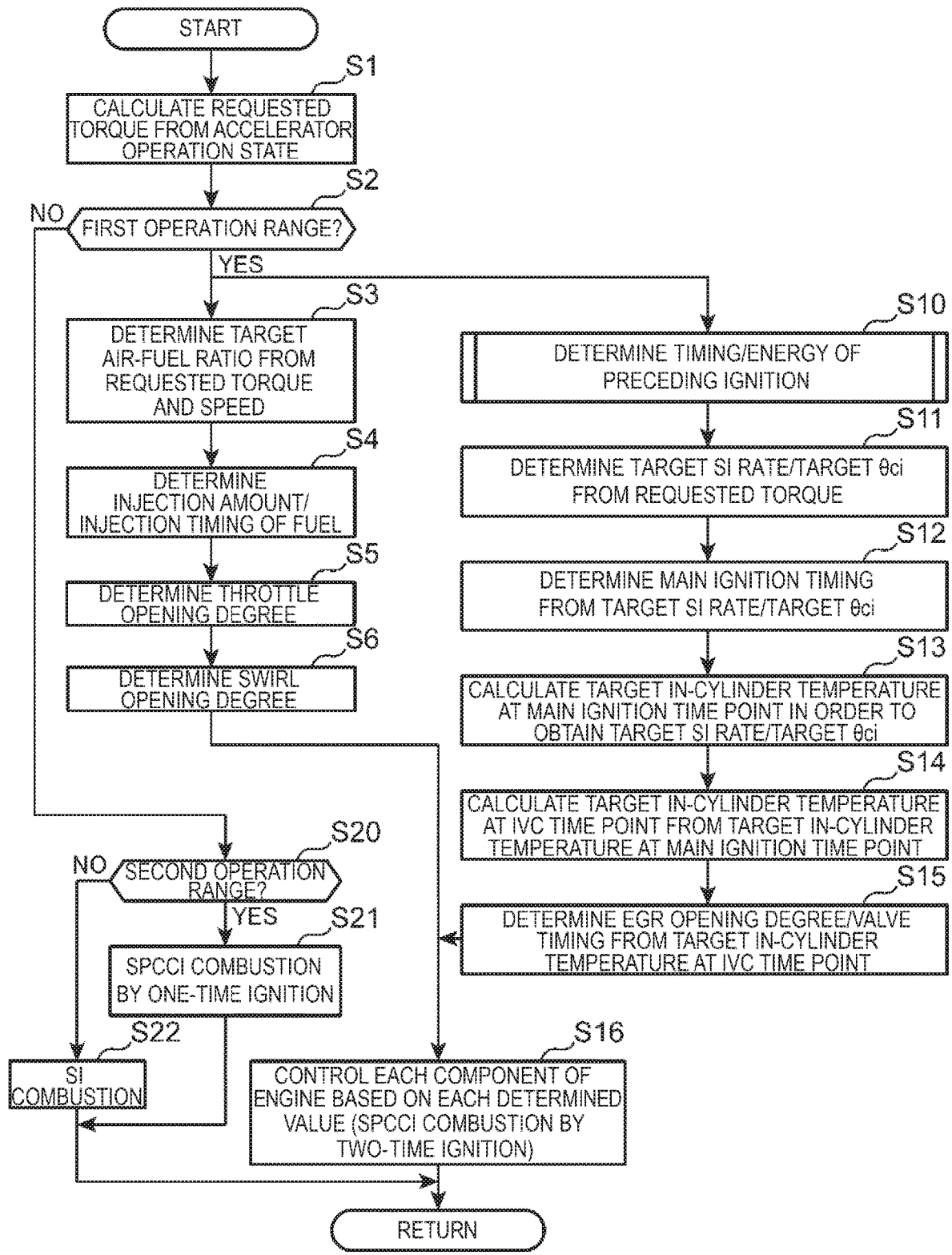
FIG. 13 is a flowchart illustrating a specific example of combustion control in a warm period of the engine.

FIG. 13 is a flowchart illustrating details of combustion control (mainly control during the SPCCI combustion) that is executed in the warm period of the engine. When the control illustrated in this drawing is started, in step S1, the calculation section 101 in the ECU 100 calculates the requested engine torque on the basis of an accelerator operation state. That is, the requested torque as target torque to be output from the engine is calculated on the basis of an operation amount (a depression amount) and an operation speed of the accelerator pedal that are specified from detection values of the accelerator sensor SN11. The higher requested torque is calculated as the operation amount and the operation speed of the accelerator pedal are increased.

Next, in step S2, the calculation section 101 determines whether a current operation point of the engine is in the first operation range A1 illustrated in FIG. 5. That is, the calculation section 101 specifies the operation point of the engine at a current time point on the operation map in FIG. 5 on the basis of the engine speed detected by the crank angle sensor SN1 and the requested torque calculated in step S1, and determines whether the current operation point is in the first operation range A1 of the map.

If it is determined NO in step S2 and thus is confirmed that the current operation point of the engine is not in the first operation range A1, in step S20, the calculation section 101 determines whether the current operation point is in the second operation range A2.

If it is determined YES in step S20 and is confirmed that the current operation point of the engine is in the second operation range A2, as control corresponding to this second operation range A2, each of the control sections 102 to 106 in the ECU 100 executes control (step S21) to subject the air-fuel mixture to the SPCCI combustion by the one-time spark ignition by the ignition plug 16. Contents of the control herein are the same as that described above in (3-2). Thus, the detailed description thereon will not be made here.

If it is determined NO in step S20, that is, if it is confirmed that the current operation point of the engine is in the third operation range A3, as control corresponding to this third operation range A3, each of the control sections 102 to 106 in the ECU 100 executes control (step S22) to subject the air-fuel mixture to the SI combustion instead of the SPCCI combustion. Contents of the control herein are the same as that described above in (3-3). Thus, the detailed description thereon will not be made here.

Next, a description will be made on control that is executed if it is determined YES in step S2, that is, if it is confirmed that the current operation point of the engine is in the first operation range A1. In this case, in step S3, the calculation section 101 in the ECU 100 determines the target air-fuel ratio as the target value of the air-fuel ratio (A/F) in the combustion chamber 6 on the basis of the requested torque (load) and the speed of the engine. That is, the calculation section 101 determines the target air-fuel ratio that conforms to the current operation point (the speed/the load) on the basis of the requested engine torque calculated in step S1, the engine speed detected by the crank angle sensor SN1, and the map of the target air-fuel ratio illustrated in FIG. 8.

Next, in step S4, the calculation section 101 determines the injection amount and the injection timing of the fuel to be injected from the injector 15 on the basis of the requested engine torque calculated in step S1 and the engine speed detected by the crank angle sensor SN1. The injection amount/the injection timing of the fuel determined herein are the predetermined injection amount/the injection timing per engine operation condition to obtain the target SI rate and the target θCi described above. As illustrated in Chart (a) in FIG. 6 and Chart (b) in FIG. 6, in the first operation range A1, the injection amount/the injection timing of the fuel are determined such that the fuel is injected by being divided into the first injection and the second injection and that the injection amount is larger in the first injection than in the second injection.

In step S5, the calculation section 101 determines the opening degree of the throttle valve 32 on the basis of the target air-fuel ratio determined in step S3. That is, based on a precondition that the amount of the fuel determined in step S4 is supplied to the combustion chamber 6, the calculation section 101 calculates such an opening degree of the throttle valve 32 that an amount of the air (the fresh air) corresponding to the target air-fuel ratio is introduced into this combustion chamber 6, and determines this as a target opening degree value of the throttle valve 32.

Furthermore, in step S6, the calculation section 101 determines the opening degree of the swirl valve 18 on the basis of the requested torque (load) and the speed of the engine. That is, the calculation section 101 specifies the opening degree of the swirl valve 18 that conforms to the current operation point (the speed/the load) on the basis of the requested engine torque calculated in step S1, the engine speed detected by the crank angle sensor SN1, and the map of the swirl opening degree illustrated in FIG. 9, and determines this as a target opening degree value of the swirl valve 18.

During the operation in the first operation range A1, in parallel with the determination of the injection amount/the injection timing as described so far, target control values related to the spark ignition and the EGR (the external EGR/the internal EGR) are determined. That is, if it is determined YES in step S2 and is confirmed that the current operation point is in the first operation range A1, the processing proceeds to step S10, and the calculation section 101 determines the timing and the energy of the preceding ignition by the ignition plug 16. A detailed description on this determination process will be made with a control flow in FIG. 14, which will be described below.

Next, in step S11, the calculation section 101 determines the target SI rate and the target θCi on the basis of the requested engine torque calculated in step S1. As described in above-described (5), the target SI rate in the first operation range A1 is determined to be generally reduced on the higher-load side where the requested torque is high (that is, the ratio of the CI combustion is increased on the higher-load side). In addition, the target θCi is determined in association with this determined target SI rate.

Next, in step S12, the calculation section 101 determines the timing of the main ignition by the ignition plug 16 on the basis of the target SI rate and the target θCi determined in step S11. That is, the calculation section 101 specifies: the initiation timing (θSi illustrated in FIG. 7) of the SI combustion that is required to achieve the combustion conforming to the target SI rate and the target θCi; and the crank angle that is advanced by a specified ignition delay time (a time required from the main ignition to the ignition) from the initiation timing θSi of this SI combustion, and determines this as a target value of the main ignition timing. The main ignition is normal spark ignition that is carried out after a voltage of a capacitor included in an ignition circuit of the ignition plug 16 is increased to a maximum voltage. Thus, differing from the preceding ignition, it is not necessary to determine the ignition energy according to the condition.

Next, in step S13, the calculation section 101 calculates the in-cylinder temperature that is required at a time point of the main ignition in order to obtain the target SI rate and the target θCi, and determines this as a target in-cylinder temperature at the main ignition time point.

Next, in step S14, based on the target in-cylinder temperature at the main ignition time point calculated in step S13, the calculation section 101 calculates the in-cylinder temperature that should be obtained at close timing of the intake valve 11 (hereinafter also referred to as IVC) at which the compression of the combustion chamber 6 is substantially initiated, that is, the target in-cylinder temperature at an IVC time point. This target in-cylinder temperature at the IVC time point is calculated on the basis of the target in-cylinder temperature at the main ignition time point and an increase amount of the in-cylinder temperature that is estimated from a compression allowance of the piston 5 from the IVC to the main ignition.

Next, in step S15, the calculation section 101 determines the opening degree of the EGR valve 53 and the valve timing of the intake/exhaust valves 11, 12 on the basis of the target in-cylinder temperature at the IVC time point calculated in step S14. That is, the calculation section 101 calculates the external EGR rate and the internal EGR rate that are required to obtain the target in-cylinder temperature at the IVC time point on the basis of a difference between the target in-cylinder temperature at the IVC time point and the detected temperature by the first intake temperature sensor SN5 (that is, the temperature of the fresh air). Then, the calculation section 101 calculates the opening degree of the EGR valve 53 that is required to obtain the calculated external EGR rate, determines this as a target opening degree value of the EGR valve 53, calculates the valve timing of the intake/exhaust valves 11, 12 required to obtain the calculated internal EGR rate, and determines this as target values of the valve timing.

Next, in step S16, the control sections (the injection control section 102, the ignition control section 103, the swirl control section 104, the intake control section 105, and the EGR control section 106) in the ECU 100 drive the injector 15, the ignition plug 16, the swirl valve 18, the throttle valve 32, the EGR valve 53, and the intake/exhaust VVTs 13a, 14a on the basis of the various target control values determined in above-described steps.

For example, the injection control section 102 controls the injector 15 such that the amount of the fuel determined in step S4 is injected from the injector 15 at the determined timing.

As the preceding ignition, the ignition control section 103 controls the ignition plug 16 such that the spark having the energy determined in step S10 is generated from the ignition plug 16. In addition, as the main ignition following this preceding ignition, the ignition control section 103 controls the ignition plug 16 such that the spark is generated from the ignition plug 16 at the timing determined in step S12.

The swirl control section 104 controls the swirl valve 18 such that the opening degree of the swirl valve 18 matches the swirl opening degree determined in step S6.

The intake control section 105 controls the throttle valve 32 such that the opening degree of the throttle valve 32 matches the throttle opening degree determined in step S5.

The EGR control section 106 controls the EGR valve 53 such that the opening degree of the EGR valve 53 matches the opening degree determined in step S15, and controls the intake/exhaust VVTs 13a, 14a such that the intake/exhaust valves 11, 12 are opened/closed at timing corresponding to the valve timing also determined in step S15.

With the control as described so far, in step S16, the air-fuel mixture of the fuel and the air injected into the combustion chamber 6 is subjected to the preceding ignition and the main ignition, and is thereafter burned by the SPCCI combustion.

(7) DETERMINATION OF TIMING/ENERGY OF PRECEDING IGNITION

Figure 14:
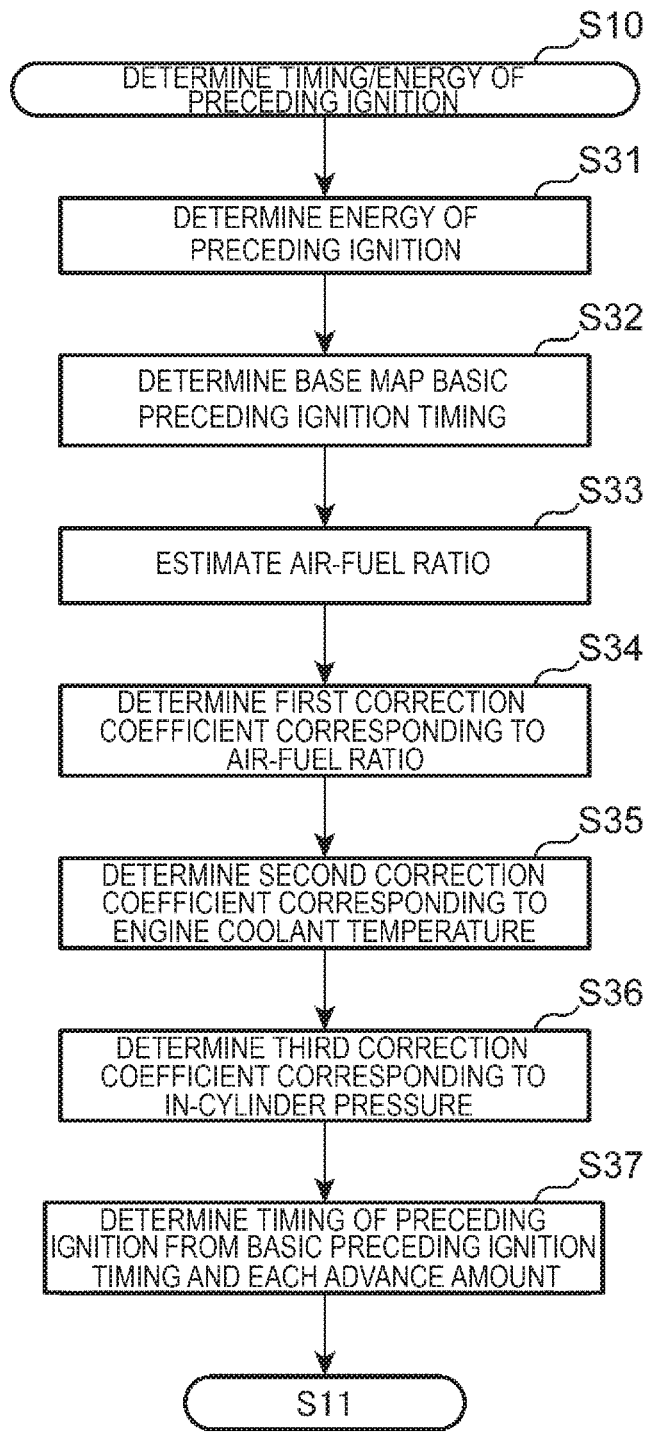
FIG. 14 illustrates a subroutine in which details of control in step S10 in FIG. 13 is illustrated.

Next, a description will be made on a specific procedure at the time when the timing and the energy of the preceding ignition is determined in above-described step S10. FIG. 14 illustrates a subroutine in which details of the control in step S10 are illustrated. When this control is started, in step S31, the calculation section 101 in the ECU 100 determines the energy of the preceding ignition. In this embodiment, the energy of the preceding ignition is set in advance according to the engine operation condition, and the calculation section 101 sets the energy of the preceding ignition to a value corresponding to the current engine operation condition.

Figure 15:
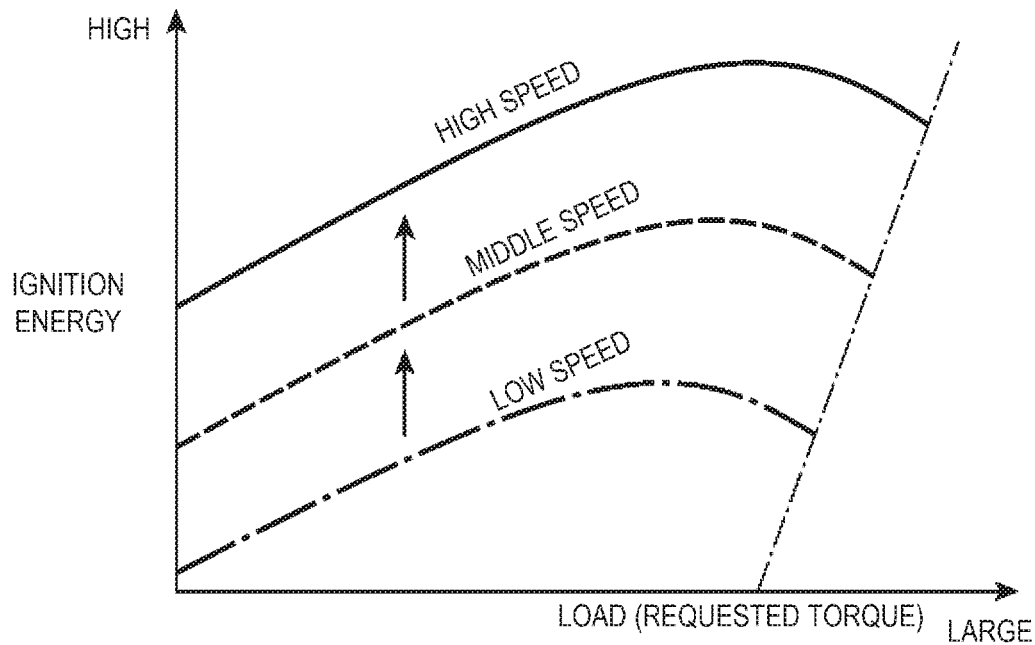
FIG. 15 is a map for determining energy of preceding ignition.

For example, the calculation section 101 stores the map illustrated in FIG. 15 and uses this map to determine the energy of the preceding ignition. The map in FIG. 15 illustrates the relationship between an engine load and the energy of the preceding ignition in the case where the engine speed is set to be constant, in detail, in the case where the speed is maintained to any of the low speed, the middle speed, and the high speed in the first operation range A1. As illustrated in FIG. 15, in this embodiment, the energy of the preceding ignition is specified from the speed and the load (the requested torque) of the engine and is generally set to be increased with the increase in the engine speed and the load. In detail, under a condition that the engine speed is constant, the energy of the preceding ignition is increased with the increase in the load in a large portion of a load range except for a range where the engine load is extremely high (near the upper limit load in the first operation range A1). However, in the range where the engine load is extremely high, reversely, the energy of the preceding ignition is reduced with the increase in the load. Such a tendency also appears in the case where the engine speed is maintained to any of the low speed, the middle speed, and the high speed.

In this embodiment, in step S31, the energy of the preceding ignition is determined by applying the engine load (the requested torque)/speed at the current time point to the map in above FIG. 15. At this time, the energy of the preceding ignition that is not defined in the map can be calculated by linear interpolation, for example. That is, FIG. 15 defines a characteristic of the energy of the preceding ignition (the relationship between the engine load and the ignition energy) in the case where the engine speed is any of the low speed, the middle speed, and the high speed. However, in the case where the engine speed is none of the above three speeds, the energy of the preceding ignition can be determined by the linear interpolation using two prescribed values that are close to each other. In order to improve accuracy of this linear interpolation, a characteristic that corresponds to the different speed from the above three engine speeds (the low speed, the middle speed, and the high speed) may be added to FIG. 15.

Next, in step S32, the calculation section 101 determines basic preceding ignition timing that is a basic value of the timing of the preceding ignition.

Figure 16A:
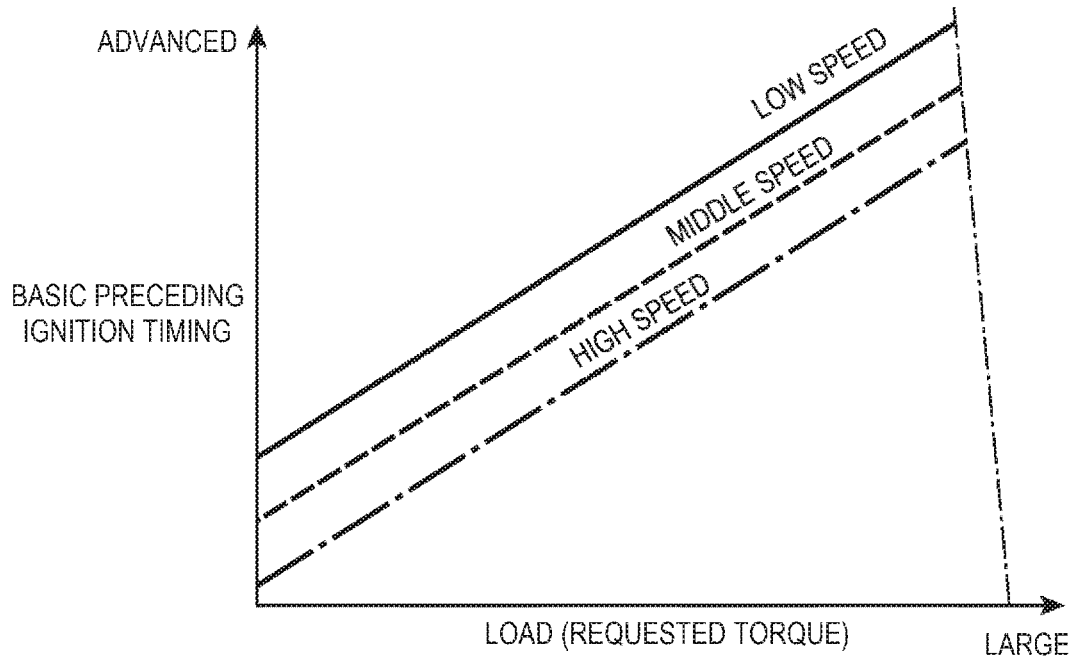
FIG. 16A is a map for determining basic preceding ignition timing according to an engine load/engine speed.
Figure 16B:
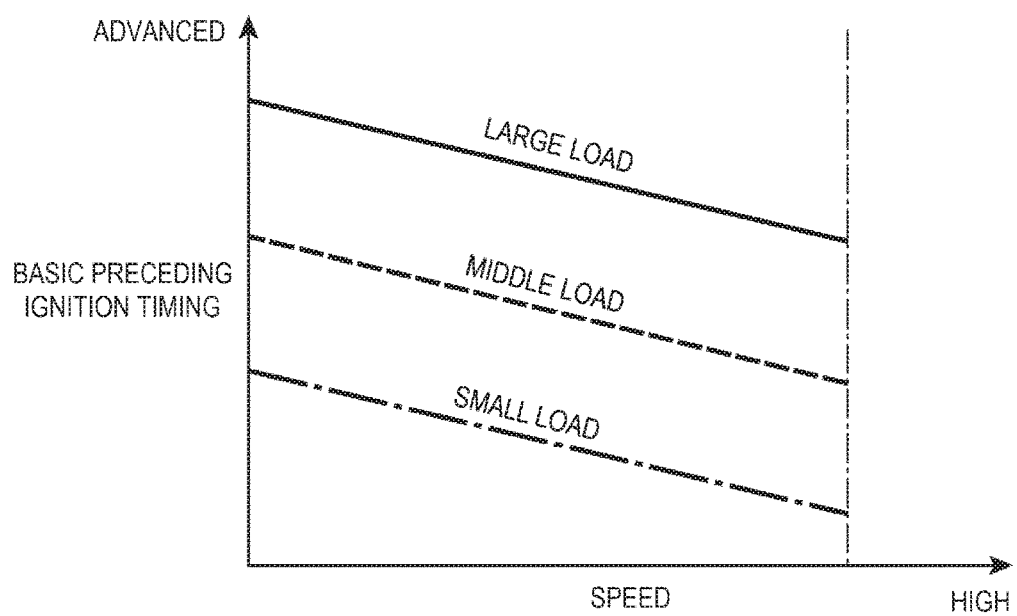
FIG. 16B is a map that corresponds to FIG. 15A and in which a parameter on a horizontal axis is changed from the load to the speed.

FIG. 16A and FIG. 16B illustrate specific examples of base maps that are used when the basic preceding ignition timing is determined in step S32. As illustrated in the drawings, the basic preceding ignition timing is specified from the speed and the load (the requested torque) of the engine and is generally set to be retarded with the increase in the engine speed and is set to be advanced with the increase in the load. Each of the maps in FIG. 16A and FIG. 16B defines a relationship among the engine speed, the engine load, and the basic preceding ignition timing, and the same relationship is illustrated in the maps. Accordingly, provision of one of the maps in FIG. 16A and FIG. 16B suffices. However, in order to facilitate understanding, the map having the load on a horizontal axis (FIG. 16A) and the map having a vertical axis as the horizontal axis (FIG. 16B) are provided.

More specifically, the map in FIG. 16B illustrates the relationship between the engine speed and the basic preceding ignition timing in the case where the engine load is set to be constant, in detail, in the case where the engine load is maintained to any load of the low load, the middle load, and the high load in the first operation range A1. As illustrated in the drawing, under a condition that the engine load is constant, the basic preceding ignition timing is retarded with the increase in the engine speed. The relationship between the speed and the basic preceding ignition timing in this case is a substantially and directly proportional relationship, that is, a relationship in which the basic preceding ignition timing is retarded in a linear function manner according to the speed. The same applies to the case where the engine load is maintained to any of the low load, the middle load, and the high load.

The map in FIG. 16A illustrates the relationship between the engine load and the basic preceding ignition timing in the case where the engine speed is set to be constant, in detail, in the case where the engine speed is maintained to any speed of the low speed, the middle speed, and the high speed in the first operation range A1. As illustrated in the drawing, under a condition that the engine load is constant, the basic preceding ignition timing is advanced with the increase in the engine load. The relationship between the engine load and the basic preceding ignition timing in this case is a substantially and directly proportional relationship, that is, a relationship in which the basic preceding ignition timing is advanced in a linear function manner according to the engine load. Such a tendency also appears in the case where the engine speed is maintained to any of the low speed, the middle speed, and the high speed.

In step S32, the basic preceding ignition timing is determined by applying the engine load (the requested torque)/speed at the current time point to any of the maps in FIG. 16A and FIG. 16B. At this time, similar to step S31, the basic preceding ignition timing that is not defined in the maps can be calculated by linear interpolation, for example. That is, FIG. 16A defines a characteristic of the basic preceding ignition timing (the relationship between the engine load and the basic preceding ignition timing) in the case where the engine speed is any of the low speed, the middle speed, and the high speed. However, in the case where the current speed is none of the above three speeds, the basic preceding ignition timing can be determined by the linear interpolation using two prescribed values that are close to each other. Similarly, FIG. 16B defines the characteristic of the basic preceding ignition timing (the relationship between the engine speed and the basic preceding ignition timing) in the case where the engine load is any of the low load, the middle load, and the high load. However, in the case where the engine load is none of the above three loads, the basic preceding ignition timing can be determined by the linear interpolation using two prescribed values that are close to each other. In order to improve accuracy of this linear interpolation, a characteristic that corresponds to the different speed from the above three engine speeds (the low speed, the middle speed, and the high speed) may be added to FIG. 16A. Similarly, a characteristic that corresponds to the different load from the above three engine loads (the low load, the middle load, and the high load) may be added to FIG. 16B.

Here, a purpose of the preceding ignition is to modify a property of the fuel by applying the energy so as not to cause the flame propagation to the air-fuel mixture that is not sufficiently compressed. In order to achieve this purpose, it is necessary to increase the temperature of the air-fuel mixture around the spark (the arc) by the preceding ignition to the temperature that is equal to or higher than 850 K and lower than 1140 K. By producing an air-fuel mixture layer in such a temperature zone (hereinafter also referred to as a high-temperature portion), it is possible to produce the intermediate product such as OH radicals by cleaving the fuel component (hydrocarbons) and to improve reactivity thereafter. The map of the energy of the preceding ignition used in step S31 and the maps of the basic preceding ignition timing used in step S32 are predetermined to conform to such a purpose of the preceding ignition, that is, to generate the high-temperature portion at equal to or higher than 850 K and lower than 1140 K around the spark.

However, likeliness of the occurrence of the flame propagation varies by the environment (the temperature, the pressure, and the like) of the combustion chamber 6. Accordingly, the timing of the preceding ignition has to be adjusted in consideration thereof. It is needless to say that the basic preceding ignition timing determined in step S32 is determined in consideration of the environment of the combustion chamber 6, which varies according to the load/ the speed of the engine, in advance. Meanwhile, there is often a case where the environment of the combustion chamber 6 in the actual engine varies from the assumed environment due to various factors. Accordingly, the timing of the preceding ignition is corrected in following steps S33 to S37 such that the preceding ignition is carried out at appropriate timing even with such variations.

First, in step S33, the calculation section 101 estimates the air-fuel ratio of the air-fuel mixture in the combustion chamber 6. In this embodiment, during the operation in the first operation range A1, the fuel injection amount from the injector 15 and the opening degree of the throttle valve 32 are controlled to values with which the target air-fuel ratio illustrated in FIG. 8 can be obtained. However, the actual air-fuel ratio may vary from the target air-fuel ratio due to a fluctuation in the air amount or the like. Thus, in order to grasp the accurate air-fuel ratio near an actual value, the air-fuel ratio of the air-fuel mixture is estimated on the basis of various conditions. More specifically, the calculation section 101 calculates the amount of the air (the fresh air) that is actually introduced into the combustion chamber 6 on the basis of various parameters including the in-cylinder pressure at the IVC time point (the close timing of the intake valve 11) detected by the in-cylinder pressure sensor SN3, the flow rate of the intake air (the fresh air) detected by the airflow sensor SN4 before the IVC, the differential pressure between the upstream side and the downstream side of the EGR valve 53 detected by the differential pressure sensor SN9 before the IVC, and the valve timing of the intake/ exhaust valves 11, 12 set by the intake/exhaust VVTs 13a, 14a. Then, the calculation section 101 calculates the air-fuel ratio (A/F) as a weight ratio between the air and the fuel on the basis of the calculated air amount and the fuel injection amount from the injector 15 determined in step S4, and determines this as an estimation value of the air-fuel ratio of the air-fuel mixture that is actually produced in the combustion chamber 6.

In addition to estimation processing of the air-fuel ratio in step S33, the calculation section 101 constantly executes learning processing using the linear $O_2$ sensor SN10. That is, the calculation section 101 compares the air-fuel ratio estimated in step S33 with the air-fuel ratio that is specified from the detection value of the linear $O_2$ sensor SN10, and, in the case where there is an error therebetween, corrects a calculation formula for the estimation in a manner to reduce the error. Such learning processing leads to improvement in estimation accuracy of the air-fuel ratio.

Next, in step S34, the calculation section 101 determines a first advance amount (a first correction coefficient) dt1 that corresponds to the air-fuel ratio (A/F) of the air-fuel mixture in the combustion chamber 6. This first advance amount dt1 is a coefficient used to correct the timing of the preceding ignition according to the air-fuel ratio of the air-fuel mixture, and varies from a value that is smaller than 0 to a value that is larger than 0. The first advance amount dt1 being larger (smaller) than 0 indicates that the timing of the preceding ignition is corrected to be advanced (retarded) from the basic preceding ignition timing.

Figure 17A:
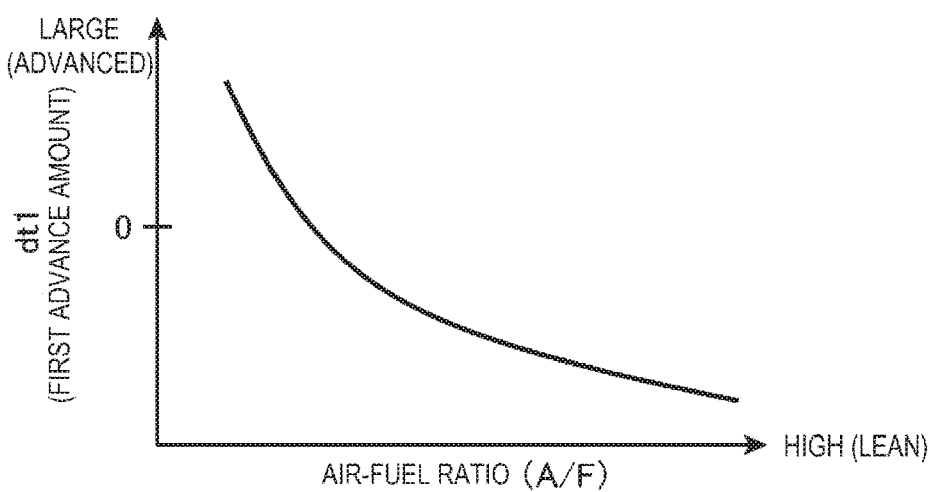
FIG. 17A is a map for correcting the basic ignition timing, and illustrates a relationship between an air-fuel ratio and a first advance amount.

A map illustrated in FIG. 17A is used to determine the first advance amount dt1. As illustrated in the drawing, the first advance amount dt1 is set to a smaller value as the air-fuel ratio of the air-fuel mixture is increased (that is, as the air-fuel ratio becomes leaner). This means that, in the case where the various conditions except the air-fuel ratio are the same, the timing of the preceding ignition is retarded with the increase in the air-fuel ratio. In addition, as it is understood from an inclination of the graph in FIG. 17A, a reduction rate of the first advance amount dt1 with respect to the air-fuel ratio is set to be smaller in a range where the air-fuel ratio is high than in a range where the air-fuel ratio is low. The calculation section 101 applies the air-fuel ratio of the air-fuel mixture that is estimated in step S33 to the map in FIG. 17A, and thereby determines the first advance amount dt1 that conforms to the air-fuel ratio at the current time point.

Next, in step S35, the calculation section 101 determines a second advance amount (a second correction coefficient) dt2 that corresponds to the engine coolant temperature. This second advance amount dt2 is a coefficient used to correct the timing of the preceding ignition according to the engine coolant temperature, and varies from a value that is smaller than 0 to a value that is larger than 0. The second advance amount dt2 being larger (smaller) than 0 indicates that the timing of the preceding ignition is corrected to be advanced (retarded) from the basic preceding ignition timing.

Figure 17B:
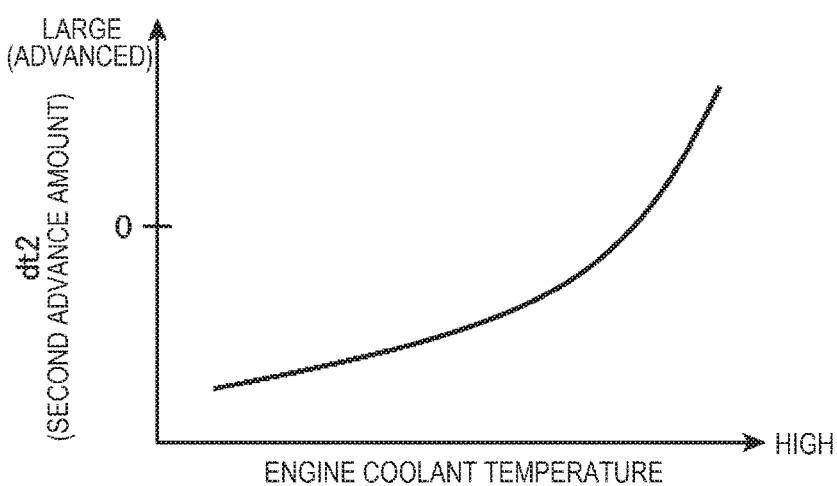
FIG. 17B is a map for correcting the basic ignition timing, and illustrates a relationship between an engine coolant temperature and a second advance amount.

A map illustrated in FIG. 17B is used to determine the second advance amount dt2. As illustrated in the drawing, the second advance amount dt2 is set to a larger value as the engine coolant temperature is increased. This means that, in the case where the various conditions except the engine coolant temperature are the same, the timing of the preceding ignition is advanced with the increase in the engine coolant temperature. In addition, as it is understood from an inclination of the graph in FIG. 17B, an increase rate of the second advance amount dt2 with respect to the engine coolant temperature is set to be lower in a range where the engine coolant temperature is low than in a range where the engine coolant temperature is high. The calculation section 101 applies the engine coolant temperature that is detected by the coolant temperature sensor SN2 to the map in FIG. 17B, and thereby determines the second advance amount dt2 that conforms to the engine coolant temperature at the current time point. The engine coolant temperature is highly correlated with the in-cylinder temperature. Thus, the determination of the second advance amount dt2 as in the mode illustrated in FIG. 17B is equivalent to that the timing of the preceding ignition is advanced with the increase in the in-cylinder temperature. In addition, the reduction rate described herein is a value that is acquired in the case where a variation at the time when the timing of the preceding ignition is changed to be retarded has a positive value, and indicates that the timing of the preceding ignition is further significantly retarded as this reduction rate is increased.

Next, in step S36, the calculation section 101 determines a third advance amount (a third correction coefficient) dt3 that corresponds to the in-cylinder pressure at the IVC time point (the close timing of the intake valve 11). This third advance amount dt3 is a coefficient used to correct the timing of the preceding ignition according to the in-cylinder pressure at the IVC time point, and varies from a value that is smaller than 0 to a value that is larger than 0. The third advance amount dt3 being larger (smaller) than 0 indicates that the timing of the preceding ignition is corrected to be advanced (retarded) from the basic preceding ignition timing.

Figure 17C:
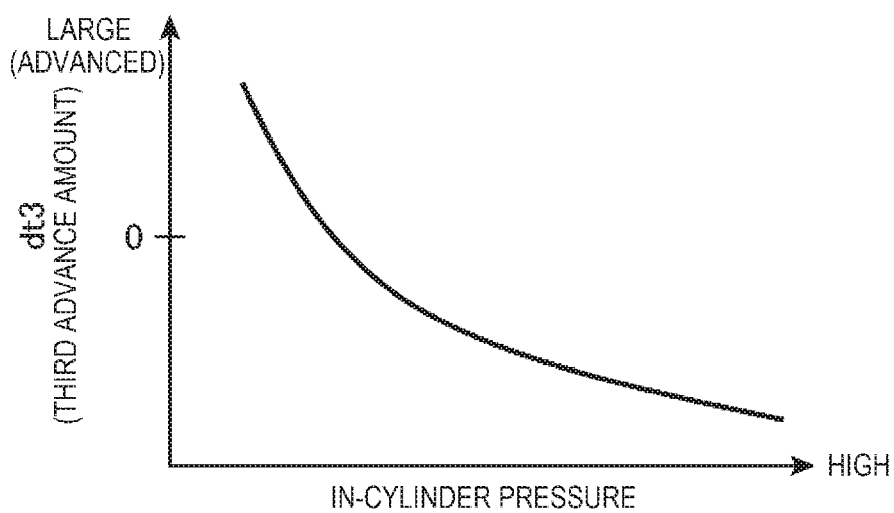
FIG. 17C is a map for correcting the basic ignition timing, and illustrates a relationship between an in-cylinder pressure and a third advance amount.

A map illustrated in FIG. 17C is used to determine the third advance amount dt3. As illustrated in the drawing, the third advance amount dt3 is set to a smaller value as the in-cylinder pressure at the IVC time point is increased. This means that, in the case where the various conditions except the in-cylinder pressure are the same, the timing of the preceding ignition is retarded with the increase in the in-cylinder pressure at the IVC time point. In addition, as it is understood from an inclination of the graph in FIG. 17C, a reduction rate of the third advance amount dt3 with respect to the in-cylinder pressure at the IVC time point is set to be smaller in a range where the in-cylinder pressure is high than in a range where the in-cylinder pressure is low. The calculation section 101 applies the in-cylinder pressure at the IVC time point, which is detected by the in-cylinder pressure sensor SN3, to the map in FIG. 17C, and thereby determines the third advance amount dt3 that conforms to the in-cylinder pressure at the current time point.

Next, in step S37, the calculation section 101 determines the timing of the preceding ignition on the basis of the basic preceding ignition timing (the basic ignition timing) and each of the above advance amounts dt1 to dt3. That is, the calculation section 101 performs the calculation to apply each of the first to third advance amounts dt1 to dt3, which are determined in steps S34 to S36, to the basic preceding ignition timing determined in step S32, and determines a value acquired by the calculation as the final timing of the preceding ignition. At this time, it is assumed that each of the advance amounts dt1 to dt3 has the same weight, and these advance amounts dt1 to dt3 are simply added to acquire a total advance amount. Then, timing that is advanced from the basic preceding ignition timing by this advance amount (in the case where the total advance amount is smaller than 0, timing that is retarded from the basic preceding ignition timing by an absolute value of the total advance amount) can be set as the ignition timing of the preceding ignition. However, influences of the air-fuel ratio, the engine coolant temperature (the in-cylinder temperature), and the in-cylinder pressure on the flame propagation property possibly differ from each other. In this case, it is desired to apply the different weight corresponding to a degree of the influence to each of the advance amounts dt1 to k3 in consideration of the differences in the degree of the influence of the above three. For example, each of the advance amounts dt1 to dt3 may be multiplied by a different coefficient, acquired values may be added, and then timing that is advanced from the basic preceding ignition timing by this total value (in the case where the total value is smaller than 0, timing that is retarded by an absolute value of the total amount) may be set as the timing of the preceding ignition. In this case, a correction orientation and a correction amount of the basic preceding ignition timing depend on the value of each of the advance amounts dt1 to dt3 and the weight thereof. However, when each of the first to third advance amounts dt1 to dt3 is larger than 0, the timing of the preceding ignition is corrected to be advanced from the basic preceding ignition timing. On the contrary, when each of the first to third advance amounts dt1 to dt3 is smaller than 0, the timing of the preceding ignition is corrected to be retarded from the basic preceding ignition timing.

As it has already been described, the timing of the preceding ignition that is determined as described so far is set as the timing at which the energy of the preceding ignition is lower than the energy of the main ignition and with which the property of the fuel is modified (OH radicals and the like are produced), in detail, the timing at which the high-temperature portion at equal to or higher than 850 K and lower than 1140 K is generated around the spark (the arc) by the preceding ignition.

(8) SPECIFIC OPERATION OF PRECEDING IGNITION/MAIN IGNITION

As described above, in this embodiment, during the operation in the first operation range A1, the preceding ignition with the low energy and the main ignition with the high energy are carried out in one cycle. In order to cause the ignition plug 16 to carry out such spark ignition with the different energy twice (the preceding ignition and the main ignition), the ignition plug 16 is controlled as follows, for example.

In this embodiment, the single ignition plug 16 is provided for the single cylinder 2, and the single ignition plug 16 includes the single ignition circuit constructed of an LC circuit including a coil, the capacitor, and the like. Thus, in order to cause the ignition plug 16 to carry out the spark ignition twice, it is required to repeat charging/discharging of the capacitor.

Figure 18:
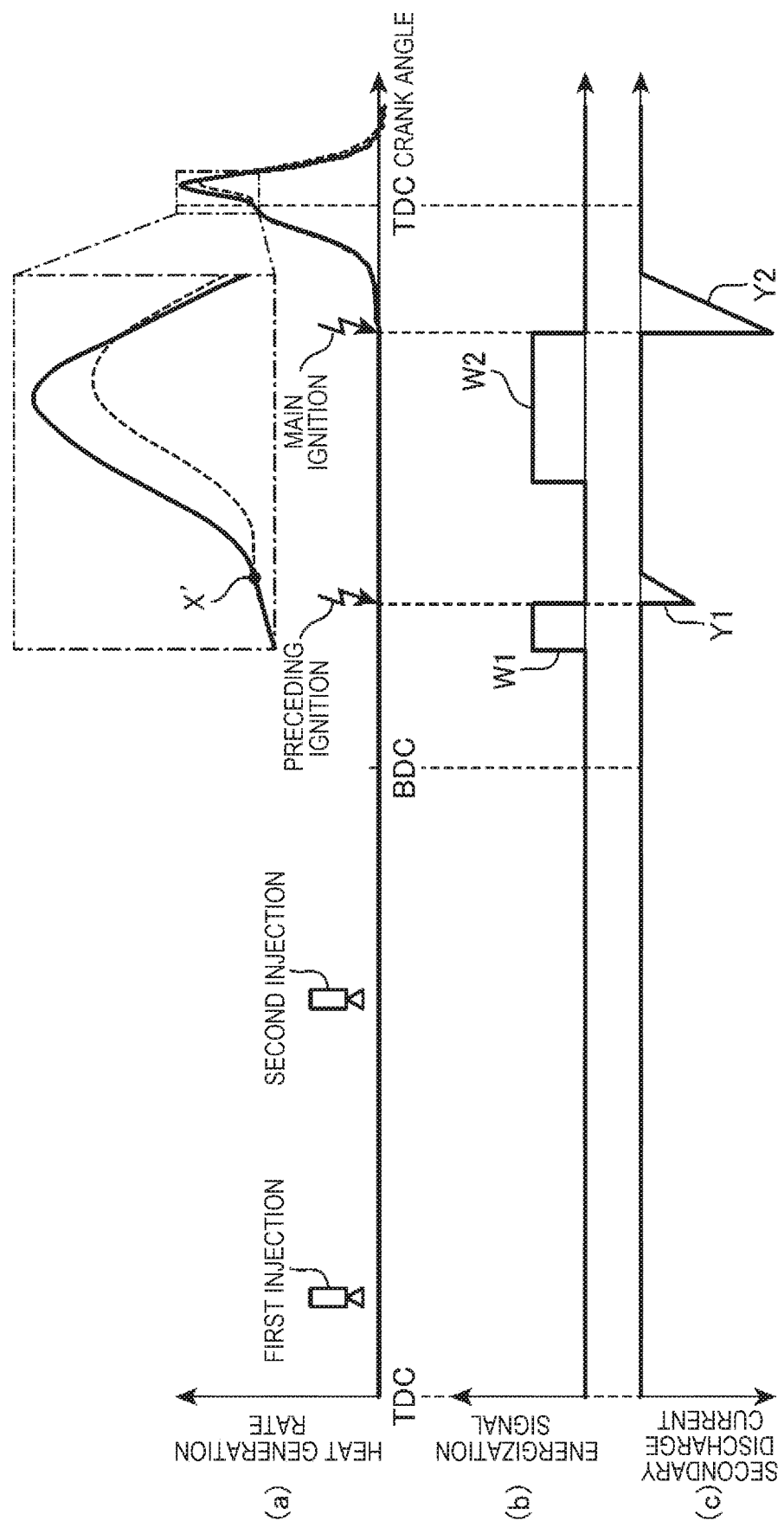
FIG. 18 is a time chart illustrating, together with combustion waveforms, an electric state of an ignition plug at the time when the preceding ignition and main ignition are carried out in the first operation range.

FIG. 18 includes time charts illustrating an electric state of the ignition plug 16 at the time when the preceding ignition and the main ignition are carried out in the first operation range 1A together with a combustion waveform, Chart (a) illustrates a waveform of the heat generation rate by the SPCCI combustion, Chart (b) illustrates a waveform of an energization command to the ignition plug 16, and Chart (c) illustrates a waveform of a discharging current from the ignition plug 16. As indicated by waveforms W1, W2 in Chart (b) illustrated in FIG. 18, the ignition plug 16 is energized prior to the preceding ignition and the main ignition. When energized times (so-called dwell times) are compared, the energization time (the waveform W1) at the time of the preceding ignition is shorter than that (the waveform W2) at the time of the main ignition. In addition, as indicated by waveforms Y1, Y2 in Chart (c) of FIG. 18, the ignition plug 16 starts being discharged (the spark is generated) at a time point at which the energization of the ignition plug 16 is stopped. At this time, since the energization time for the preceding ignition is shorter than the energization time for the main ignition, discharge energy (the waveform Y1) at the time of the preceding ignition is lower than the discharge energy (the waveform Y2) at the time of the main ignition. This can also be understood from an area of the waveform Y1 being smaller than an area of the waveform Y2.

In the example in FIG. 18, the energy that is stored by the energization for the preceding ignition (the waveform W1) is completely discharged by the preceding ignition. This means that a voltage of the capacitor after the preceding ignition is substantially dropped to zero. Accordingly, in order to store the sufficient energy for the main ignition in the ignition plug 16, at the time of the energization for the main ignition (the waveform W2), it is necessary to continue the energization for a relatively long period so as to increase the voltage of the capacitor from zero to the maximum voltage. Meanwhile, in the preceding ignition, for which only the low energy is required, the energization can be stopped before the voltage of the capacitor reaches the maximum voltage. This is a reason why the energization time for the preceding ignition is shorter than the energization time for the main ignition.

Here, at least in the preceding ignition, it is not necessary to discharge the entire energy that has been stored before, and only some of the stored energy may be discharged. That is, in the case where the energization of the ignition plug 16 is restarted while the ignition plug 16 is discharged, the ignition plug 16 stops being discharged at the time point. Thus, a larger amount of the energy than an amount of the energy that is originally required may be stored by the energization, and then the energization may be restarted in the middle of discharging (in this way, discharging is stopped). In this way, only some of the stored energy may be released from the ignition plug 16. In the case where the preceding ignition by this method is carried out, the energization time for the main ignition can be shortened. Thus, this is advantageous in a case where an interval between the preceding ignition and the main ignition is relatively short.

(9) OPERATIONAL EFFECTS

As it has been described so far, in this embodiment, in the first operation range A1 where the SPCCI combustion is carried out, the main ignition and the preceding ignition are carried out. In the main ignition, the spark is generated in the late period of the compression stroke or the initial period of the expansion stroke to initiate the SI combustion. In the preceding ignition, the spark is generated at the timing that is earlier than that in the main ignition and is later than the fuel injection timing. Such a configuration has an advantage that the SPCCI combustion at the high combustion velocity and with the superior thermal efficiency can be carried out.

That is, in the above embodiment, the preceding ignition is carried out at the earlier timing than the main ignition, and the high-temperature portion at equal to or higher than 850 K and lower than 1140 K is generated around the spark (the arc) by this preceding ignition. Accordingly, the property of the fuel can be modified such that the flame propagation of the air-fuel mixture does not occur by the preceding ignition and that the thermal efficiency in the CI combustion is improved. In detail, the fuel component (hydrocarbons) is cleaved by heating to the above temperature zone so as to produce hydrogen peroxide ($H_2O_2$) and formaldehyde ($CH_2O$), and OH radicals from these components can be produced. OH radicals have strong oxidation behavior and are high in reactivity. Thus, when the intermediate product containing such OH radicals is produced in the combustion chamber 6 after the preceding ignition, the combustion velocity of the CI combustion as the phenomenon in which the spontaneous chemical reaction of the fuel component occurs can be accelerated, which can improve the thermal efficiency.

Figure 19:
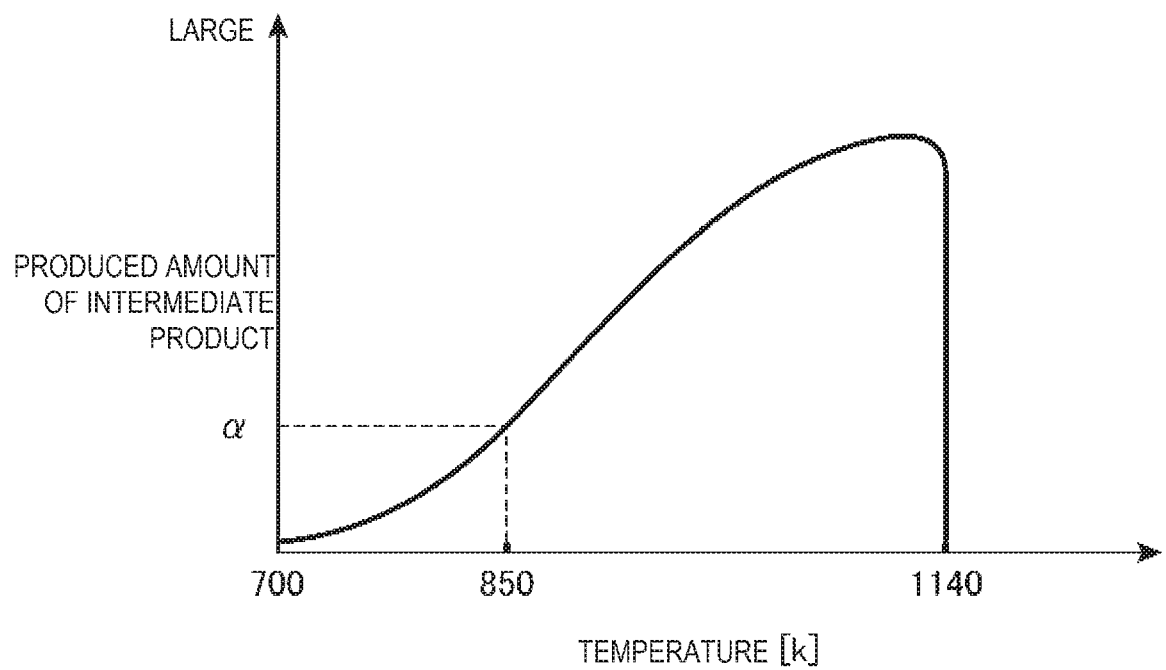
FIG. 19 is a graph illustrating a relationship between a temperature of air-fuel mixture and a produced amount of an intermediate product.

FIG. 19 is a graph illustrating a relationship between the temperature of the air-fuel mixture and a produced amount of the intermediate product, the graph being obtained by a numerical simulation performed by the inventors of the present application. As indicated in this graph, the produced amount of the intermediate product is generally increased with the increase in the temperature of the air-fuel mixture. A threshold α on a vertical axis of the graph represents the produced amount of the intermediate product that is required to exert a significant effect, and indicates that, in the case where the intermediate organism, the amount of which is equal to or larger than the threshold α, exists in the combustion chamber, the combustion velocity shows a significant difference. From the graph, in order to obtain the amount of the intermediate product that is equal to or larger than the threshold α (that is, in order to accelerate the combustion in a significant level), it is necessary to increase the temperature of the air-fuel mixture at least to 850 K. The amount of the intermediate product keeps being increased even after the temperature of the air-fuel mixture becomes higher than 850 K. However, once the temperature reaches 1140 K, the amount of the intermediate product is rapidly (almost vertically) reduced. It is considered that this is because the air-fuel mixture is burned, the flame is produced (that is, a flame reaction occurs), almost all of the intermediate product is consumed when the temperature of the air-fuel mixture reaches 1140 K.

Meanwhile, in the above embodiment, the energy and the timing of the preceding ignition are adjusted to such energy and such timing that the high-temperature portion at equal to or higher than 850 K and lower than 1140 K is generated around the spark (the arc). Accordingly, it is possible to reliably produce the intermediate product that contains OH radicals with the high reactivity by this preceding ignition, and it is possible to improve the thermal efficiency by accelerating the combustion velocity in the CI combustion. In Chart (a) of FIG. 18, the waveform of the heat generation rate (a solid line) of a case where the preceding ignition, for which the energy and the timing are appropriately adjusted just as described, is executed is compared to the waveform of the heat generation rate (a broken line) of a case where the preceding ignition is not executed. As apparent from the comparison of these two combustion waveforms, it is understood that the heat generation rate after initiation timing of the CI combustion (a retarded side from a point X') rises rapidly and the combustion velocity in the CI combustion is increased when the preceding ignition is carried out in comparison with the case where the preceding ignition is not carried out. The intermediate product that is produced by the preceding ignition is partially consumed by the SI combustion prior to the CI combustion. At the initiation time point of the SI combustion, the intermediate product spreads over a large area of the combustion chamber 6, and the intermediate product remains on an outer side of the range of the SI combustion. Thus, due to action of this remaining intermediate product, the CI combustion is accelerated with no difficulty.

Here, in order to modify the property of the fuel by the preceding ignition as described above (to produce the intermediate product such as OH radicals without causing the flame propagation), it is necessary to appropriately adjust the timing of the preceding ignition according to various types of the environment in the cylinder 2. As a result of the earnest study on this point, the inventors of the present application has obtained the following knowledge.

When the in-cylinder pressure is changed, in detail, when only the in-cylinder pressure is changed while the parameters other than the in-cylinder pressure are maintained to be constant, the limit timing of the ignition timing at which the flame propagation occurs is retarded with the increase in the in-cylinder pressure.

When the in-cylinder temperature is changed, in detail, when only the in-cylinder temperature is changed while the parameters other than the in-cylinder temperature are maintained to be constant, limit timing of the ignition timing at which the flame propagation occurs is retarded with the reduction in the in-cylinder temperature.

When the concentration of the fuel in the combustion chamber 6 is changed, in detail, when only the concentration of the fuel is changed while the parameters other than the concentration of the fuel are maintained to be constant, the limit timing of the ignition timing at which the flame propagation occurs is retarded with the reduction in the concentration of the fuel.

When the flow rate of the gas (the air and the EGR gas) flowing in the combustion chamber 6 is changed, in detail, when only the flow rate is changed while the parameters other than the flow rate are maintained to be constant, the limit timing of the ignition timing at which the flame propagation occurs is retarded with the increase in the flow rate.

The method for determining the timing of the preceding ignition (FIG. 14, FIG. 16, and FIG. 17) that has been described in the above embodiment was devised on the basis of the knowledge as described above. According to this method, the property of the fuel can reliably be modified while the occurrence of the flame propagation by the preceding ignition is avoided.

That is, in the above embodiment, as the in-cylinder pressure at the IVC time point detected by the in-cylinder pressure sensor SN3 is increased, the timing of the preceding ignition is set to be retarded (see FIG. 17C). Thus, it is possible to apply the energy to the air-fuel mixture by the preceding ignition at the appropriate timing that corresponds to the difference in the flame propagation property by advancing the ignition timing at the time when the in-cylinder pressure is low and the flame propagation is thereby likely to occur or by retarding the ignition timing at the time when the in-cylinder pressure is high and the flame propagation is thereby less likely to occur. As a result, within the range where the flame propagation of the air-fuel mixture does not occur, it is possible to generate the high-temperature portion in such an appropriate temperature zone that the property of the air-fuel mixture is sufficiently modified (that is, the high-temperature portion at equal to or higher than 850 K and lower than 1140 K) around the spark, and it is thus possible to reliably produce the intermediate product that contributes to the acceleration of the CI combustion.

For the similar purpose, in the embodiment, as the engine coolant temperature detected by the coolant temperature sensor SN2 is increased, in other words, as the in-cylinder temperature is increased, the timing of the preceding ignition is advanced (see FIG. 17B). In addition, as the air-fuel ratio of the air-fuel mixture detected from the detection values of the plural sensors SN3, SN4, SN9, and the like is increased, in other words, with the condition that the concentration of the fuel in the combustion chamber 6 is reduced, the timing of the preceding ignition is set to the timing on the retarded side (see FIG. 17A). Furthermore, as the engine speed detected by the crank angle sensor SN1 is increased, in other words, with the condition that the flow rate in the combustion chamber 6 is increased, the timing of the preceding ignition is set to the timing on the retarded side (see FIG. 16B). With these configurations, it is possible to sufficiently modify the property of the fuel so as to accelerate the CI combustion.

Here, it has been understood that, in regard to the relationship between the limit timing of the ignition timing, with which the flame propagation occurs, (hereinafter also simply referred to as the limit timing) and the in-cylinder pressure, a change rate of the limit timing with respect to the in-cylinder pressure is higher in the range where the in-cylinder pressure is low than in the range where the in-cylinder pressure is high. By reflecting such a circumstance, in the above embodiment, as illustrated in FIG. 17C, the change rate of the ignition timing of the preceding ignition with respect to the in-cylinder pressure is set to be higher in the range where the in-cylinder pressure is low than in the range where the in-cylinder pressure is high. In this way, it is possible to carry out the preceding ignition at the appropriate timing that conforms to a change characteristic of the limit timing as described above, and it is thus possible to sufficiently modify the property of the fuel so as to accelerate the CI combustion.

For the similar reason, in the above embodiment, the change rate of the timing of the preceding ignition with respect to the engine coolant temperature is set to be higher in the range where the engine coolant temperature is high than in the range where the engine coolant temperature is low (see FIG. 17B), the change rate of the timing of the preceding ignition with respect to the air-fuel ratio (A/F) is set to be lower in the range where the air-fuel ratio is high than in the range where the air-fuel ratio is low (see FIG. 17A), and the change rate of the timing of the preceding ignition with respect to the engine speed is set to have the substantially proportional relationship to the engine speed (see FIG. 16B). These characteristics are set on the basis of the characteristics that are studied in advance about the changes in the limit timing (the limit timing of the ignition timing at which the flame propagation occurs) with respect to the in-cylinder temperature, the concentration of the fuel, and the flow rate. By adjusting the timing of the preceding ignition according to the characteristics, it is possible to sufficiently modify the property of the fuel so as to accelerate the CI combustion.

In the above embodiment, the timing of the preceding ignition is set in the early period or the middle period of the compression stroke. Accordingly, the preceding ignition can be carried out at timing after the fuel injection in the intake stroke and at which the piston is sufficiently advanced from the compression top dead center. In this way, it is possible to reliably modify the property of the fuel after the injection by the preceding ignition so as to accelerate the CI combustion while the unintended occurrence of the flame propagation by the preceding ignition is avoided.

In the above embodiment, during the operation in the first operation range A1, the swirl valve 18 is closed to such an opening degree that the swirl ratio of 1.5 or higher is secured. Accordingly, it is possible to spread the intermediate product, which is produced by the preceding ignition, over the large area of the combustion chamber 6 in the short time by the swirl flow. Then, by using this spread intermediate product, it is possible to effectively increase the combustion velocity in the CI combustion that is simultaneously and frequently initiated in various portions of the combustion chamber 6.

In the above embodiment, the main ignition timing by the ignition plug 16 is adjusted such that the SI rate, which is the ratio of the heat generation amount by the SI combustion to the total heat generation amount in one cycle, matches the target SI rate, which is predetermined according to the engine operation condition, during the SPCCI combustion (during the operation in the first and second operation ranges A1, A2). Thus, it is possible to increase the ratio of the CI combustion (that is, to reduce the SI rate) as much as possible within the range where the combustion noise does not become excessive, for example. Together with the effect exerted by the modification of the property of the fuel by the preceding ignition (the acceleration of the CI combustion), this can lead to as much improvement in the thermal efficiency as possible by the SPCCI combustion.

Here, the preceding ignition, which is carried out prior to the main ignition, only functions to produce the intermediate product containing OH radicals (and thereby increase the combustion velocity in the CI combustion). Thus, even in the case where the energy or the timing of the preceding ignition is changed, the SI rate or the initiation timing of the CI combustion ($\theta Ci$) is not particularly influenced by such a change. This means that the main ignition timing for obtaining the target SI rate can uniquely be specified independently from the energy or the timing of the preceding ignition. That is, in the above embodiment, it is possible to specify the main ignition timing for obtaining the target SI rate with the high degree of accuracy while carrying out the preceding ignition to produce the sufficient amount of the intermediate product.

In the above embodiment, the operation range where the preceding ignition and the main ignition are carried out is limited only to the portion on the low-load side in the range where the SPCCI combustion is carried out (the first and second operation ranges A1, A2), that is, the first operation range A1, and the preceding ignition is not carried out in the second operation range A2 on the high-load side. Thus, it is possible to effectively avoid abnormal combustion caused by the CI combustion that is accelerated by the preceding ignition. That is, in the case where the preceding ignition is carried out to produce the intermediate product such as OH radicals in the second operation range A2 on the high-load side, the combustion velocity in the CI combustion is excessively increased, which increases a possibility of the abnormal combustion such as knocking. Meanwhile, in the above embodiment, the preceding ignition is prohibited in the second operation range A2 on the high-load side. Thus, it is possible to effectively avoid the abnormal combustion such as knocking or the like.

Even in the case where the preceding ignition is carried out in the second operation range A2, the above abnormal combustion can be avoided by retarding the main ignition timing, for example. However, the retardation of the main ignition leads to the reduction in the torque, and the fuel injection amount has to be increased to compensate for this reduction. As a result, the effect by the preceding ignition (a fuel consumption improvement effect by the acceleration of the CI combustion) is canceled. Just as described, the prohibition of the preceding ignition in the second operation range A2 has the equivalent result while the control is simplified. Thus, it is desired to prohibit the preceding ignition in the second operation range A2.

In the above embodiment, at least during the operation in the first operation range A1 in the warm period of the engine, the control is executed to carry out the SPCCI combustion while creating the lean A/F environment where the air-fuel ratio (A/F), which is the ratio between the air and the fuel in the combustion chamber 6, becomes higher than the stoichiometric air-fuel ratio. Accordingly, while the CI combustion is accelerated by the preceding ignition (and the thermal efficiency is thereby improved), the combustion temperature of the air-fuel mixture can be kept low. Thus, it is possible to effectively suppress an amount of NOx produced in association with the combustion.

In the above embodiment, in the first operation range A1 where the preceding ignition and the main ignition are carried out, the injector 15 injects the fuel by dividing the fuel into two for the first injection and the second injection at the earlier timing than the preceding ignition (in the intake stroke). Accordingly, when the injection amount/the injection timing of the fuel by the first injection and the second injection are set according to the engine operation condition, it is possible to adjust the degree of the stratification (or a degree of homogeneity) of the air-fuel mixture in the combustion chamber 6 such that the appropriate SPCCI combustion is carried out under each of the operation conditions.

For example, at the operation point P1 on the low-load side in the first operation range A1, the timing of the second injection is relatively retarded (see Chart (a) in FIG. 6). At the operation point P2 on the high-load side in the first operation range A1, the timing of the second injection is relatively advanced (see Chart (b) in FIG. 6). Thus, it is possible to produce the appropriate air-fuel mixture in the combustion chamber 6 in consideration of both of the ignitability and an emission property. That is, the timing of the second injection is retarded under the condition that the load is low and the fuel injection amount in one cycle is small. Accordingly, the air-fuel mixture can be stratified such that the concentration of the fuel in the central portion of the combustion chamber 6 is increased, and thus it is possible to improve the ignitability on the low-load side. In addition, the timing of the second injection is advanced under the condition that the load is high and the fuel injection amount is large. Accordingly, the air-fuel mixture can be homogenized such that the excessively rich air-fuel mixture is not produced locally, and thus it is possible to obtain the favorable emission performance.

However, in the first operation range A1, the fuel injection amount by the first injection is set to be larger than the fuel injection amount by the second injection regardless of the amount of the load (at any of the operation points P1, P2). In this way, the fuel is not excessively stratified, and thus it is possible to secure the favorable emission performance.

(10) MODIFIED EXAMPLES

In the above embodiment, the basic preceding ignition timing, which is the basic value of the timing of the preceding ignition, is specified from the engine load/speed by using the base maps illustrated in FIG. 16A and FIG. 16B, and the specified basic preceding ignition timing is corrected by using the advance amounts dt1 to dt3, which are based on the maps illustrated in FIG. 17A to FIG. 17C, so as to determine the corrected value as the final timing of the preceding ignition. However, the method for determining the timing of the preceding ignition is not limited thereto.

Figure 20:
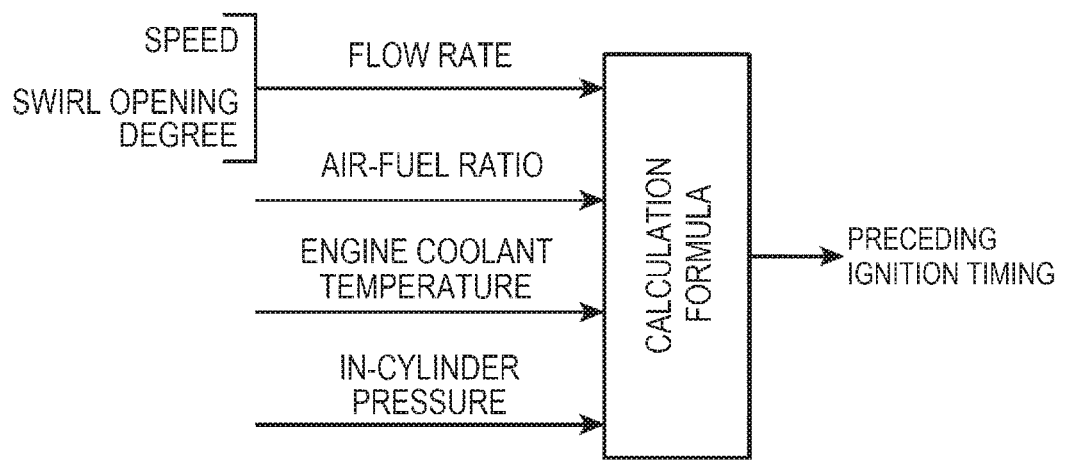
FIG. 20 is a view for illustrating a specific example of a case where ignition timing of the preceding ignition is determined by a calculation.

For example, as illustrated in FIG. 20, a specified calculation formula having, as input elements, the flow rate in the combustion chamber 6, which is estimated from the engine speed and the swirl opening degree, the air-fuel ratio (A/F) of the air-fuel mixture in the combustion chamber 6, the engine coolant temperature, and the in-cylinder pressure at the IVC time point and having the timing of the preceding ignition as an output element may be used to determine the timing of the preceding ignition. The calculation formula in this case may be set in advance such that the ignition timing is advanced with an increase in likeliness of the occurrence of the flame propagation. By using such a calculation formula, it is possible to determine the ignition timing having a similar tendency to that in the above embodiment using the maps in FIG. 16 and FIG. 17. In an example using the calculation formula as in FIG. 20, the detection value by the crank angle sensor SN1 can be used as the engine speed, the value specified from the map of the swirl opening degree illustrated in FIG. 9 can be used as the swirl opening degree, the value that is estimated in a similar method to that in step S33 illustrated in FIG. 14 can be used as the air-fuel ratio of the air-fuel mixture, the detection value by the coolant temperature sensor SN2 can be used as the engine coolant temperature, and the detection value by the in-cylinder pressure sensor SN3 can be used as the in-cylinder pressure.

In the above embodiment, the preceding ignition is carried out in the early period or the middle period of the compression stroke after the fuel injection by the first injection and the second injection is completed. However, the timing of the preceding ignition only needs to be timing at which the fuel exists in the combustion chamber 6. For example, the preceding ignition may be carried out during the intake stroke. Furthermore, the number of the preceding ignition is not limited to one in one cycle, and may be increased to two or more.

Figure 21:
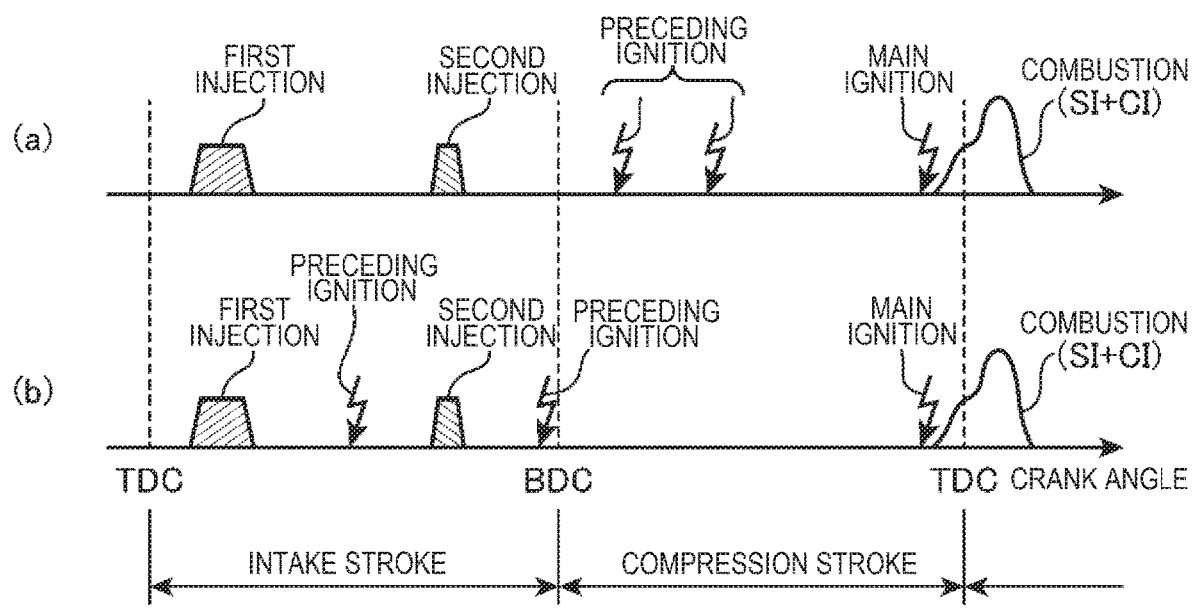
FIG. 21 includes time charts illustrating a specific example of a case where the number of the preceding ignition is increased.

For example, as illustrated in Chart (a) in FIG. 21, the preceding ignition may be carried out twice from the early period to the middle period of the compression stroke after the fuel injection by the first injection and the second injection is completed. Alternatively, as illustrated in Chart (b) in FIG. 21, the first preceding ignition may be carried out in a period between the first injection and the second injection, and the second preceding ignition may be carried out after the second injection is completed. At this time, the ignition timing of each of the preceding ignition only needs to be set according to the in-cylinder temperature, the in-cylinder pressure, the concentration of the fuel in the combustion chamber 6, and the flow rate of the gas in the combustion chamber 6 as described above.

Figure 22:
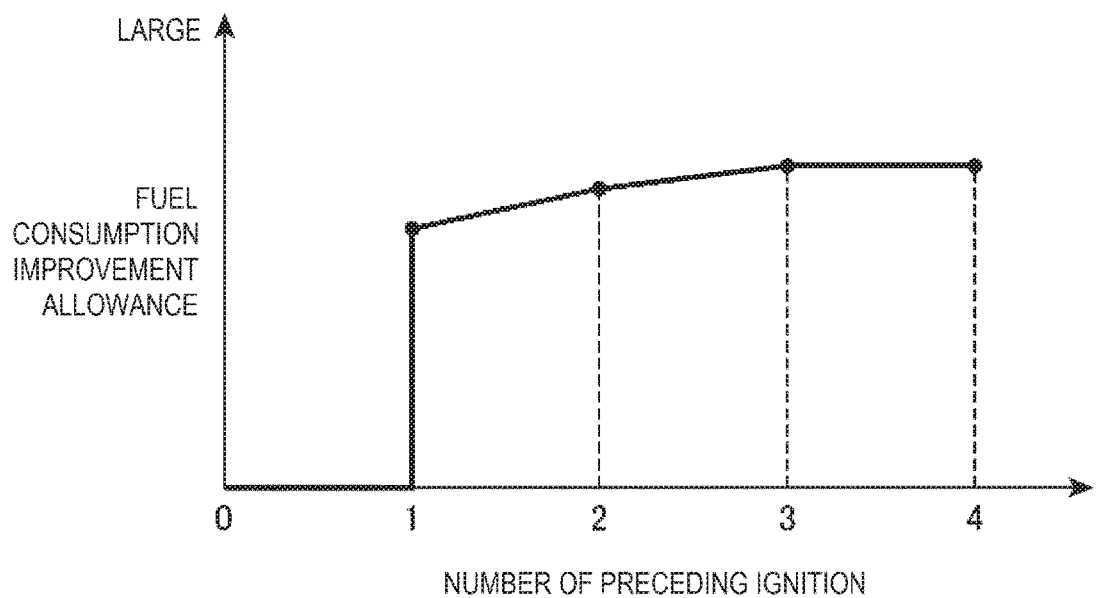
FIG. 22 is a graph illustrating a relationship between the number of the preceding ignition and a fuel consumption improvement allowance.

However, it is desired to set the number of the preceding ignition to be equal to or smaller than three. This will be described with reference to FIG. 22. FIG. 22 is a graph illustrating a relationship between the number of the preceding ignition and improvement allowance of a fuel consumption rate (g/kWh). As illustrated in this drawing, the fuel consumption rate is sufficiently improved when the preceding ignition is carried out once. Meanwhile, the fuel consumption rate is gradually and further improved when the number of the preceding ignition is increased to two or three. However, even when the number of the preceding ignition is increased from three to four, a value of the fuel consumption rate substantially remains the same. Just as described, since any effect can hardly be obtained by increasing the number of the preceding ignition to four or more, it is desired to set the number of the preceding ignition to three or less.

In the above embodiment, the in-cylinder pressure at the IVC time point is detected by the in-cylinder pressure sensor SN3, and the timing of the preceding ignition is determined by using the detected in-cylinder pressure. However, the method for specifying the in-cylinder pressure at the IVC time point is not limited to a method for directly detecting the in-cylinder pressure by the sensor. For example, the in-cylinder pressure at the IVC time point may be estimated on the basis of a specified parameter with which the in-cylinder pressure is increased with an increase in a value of the parameter. As the parameter in this case, for example, at least one of the flow rate of the intake air flowing through the intake passage 30, the opening degree of the throttle valve 32, the flow rate of the EGR gas flowing through the EGR passage 51, the engine load, and the accelerator operation amount can be set.

In the above embodiment, the engine coolant temperature, which is a representative value of the in-cylinder temperature, is detected by the coolant temperature sensor SN2, and the timing of the preceding ignition is determined by using the detected engine coolant temperature. However, for example, the in-cylinder temperature at a particular time point in one cycle may be estimated by a calculation on the basis of such a specified parameter that the in-cylinder pressure is increased with an increase in a value of the specified parameter. As the parameter in this case, for example, at least one of the engine coolant temperature (the coolant temperature), an engine lubricant temperature (a lubricant temperature), the temperature of the intake air flowing through the intake passage 30, the temperature of the exhaust gas flowing through the exhaust passage 40, the engine load, and the accelerator operation amount can be set.

In the above embodiment, when the engine is in the warm state and is operated in the first operation range A1 where the load and the speed are low, the control is executed to subject the air-fuel mixture to the SPCCI combustion while creating the lean A/F environment where the air-fuel ratio (A/F), which is the weight ratio between the air and the fuel in the combustion chamber 6, becomes higher than the stoichiometric air-fuel ratio (14.7), in detail, the environment where the air-fuel ratio exceeds 20 and is lower than 35. However, the in-cylinder environment at the time when the SPCCI combustion is carried out in the first operation range A1 is not limited thereto. For example, in addition to an amount of the air (the fresh air) corresponding to the stoichiometric air-fuel ratio, the EGR gas may be introduced into the combustion chamber 6, so as to create lean G/F environment where the air-fuel ratio (A/F) substantially matches the stoichiometric air-fuel ratio and a gas air-fuel ratio (G/F) as the weight ratio between the entire gas and the fuel in the combustion chamber 6 becomes higher than the stoichiometric air-fuel ratio, and the SPCCI combustion may be carried out in such a state. A value of the gas air-fuel ratio (G/F) in the case where the SPCCI combustion is carried out under the lean G/F environment just as described is preferably higher than 18 and lower than 50. Alternatively, in the case where the SPCCI combustion is carried out in the same first operation range A1, one of two types of the environment may be adopted according to a temperature condition such that the lean A/F environment is created in the engine warm period in which the ignitability is easily secured and that the lean G/F environment is created under a lower temperature condition than the above (for example, in a semi-warm period).

In the above embodiment, the SI rate, which is the ratio of the heat generation amount by the SI combustion to the total heat generation amount by the SPCCI combustion, is defined as R1/(R1+R2) by using the areas R1, R2 in the combustion waveform illustrated in FIG. 7, and the main ignition timing is adjusted such that this SI rate matches the predetermined target SI rate. However, various other methods for defining the SI rate are considered.

Figure 23:
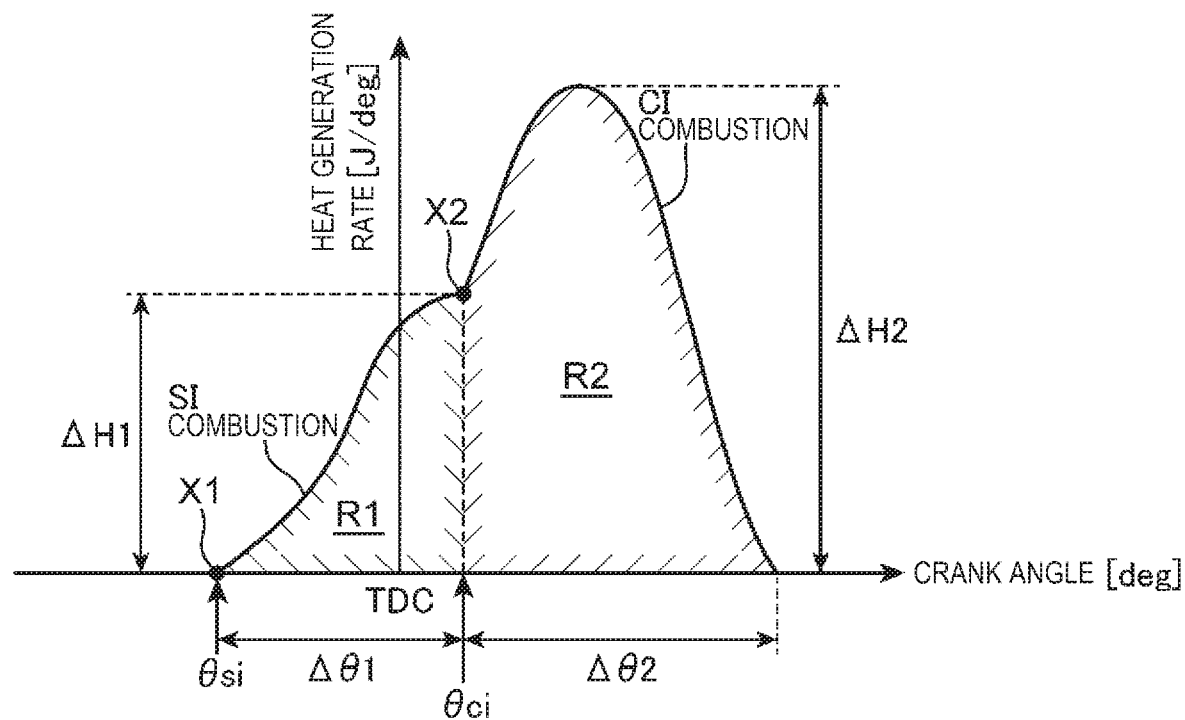
FIG. 23 is a graph for illustrating various defining methods of an SI rate and corresponding to FIG. 7.

For example, the SI rate=R1/R2 may be used. Furthermore, the SI rate may be defined by using 461, 462 illustrated in FIG. 23. That is, in the case where the crank angle period of the SI combustion (a combustion period on the advanced side of the inflection point X2) is set as 461, and the crank angle period of the CI combustion (a combustion period on the retarded side of the inflection point X2) is set as Δθ2, the SI rate=Δθ1/(Δθ1+Δθ2) or the SI rate=Δθ1/Δθ2 may be adopted. Alternatively, in the case where a peak of the heat generation rate in the SI combustion is set as ΔH1, and a peak of the heat generation rate in the CI combustion is set as ΔH2, the SI rate=ΔH1 (ΔH1'ΔH2) or the SI rate=ΔH1/ΔH2 may be adopted.

In the above embodiment, the description has been made on the case where the energy of the preceding ignition is set according to the engine speed and the engine load. However, the energy of the preceding ignition may be set to be constant regardless of the engine operation condition, and the high-temperature portion at equal to or higher than 850 K and lower than 1140 K may be generated around the spark only by adjusting the timing of the preceding ignition.

SUMMARY OF EMBODIMENT

The embodiment will be summarized as follows.

The control apparatus in the embodiment is the apparatus for controlling the compression-ignition type engine that includes: the cylinder; the injector that injects the fuel into the cylinder; and the ignition plug that ignites the air-fuel mixture, in which the fuel injected by the injector and the air are mixed, and that can carry out the partial compression ignition combustion to subject some of the air-fuel mixture to the SI combustion by the spark ignition using the ignition plug and to subject the rest of the air-fuel mixture to the CI combustion by the self-ignition. The control apparatus includes: the in-cylinder pressure specification section that specifies the in-cylinder pressure as the pressure in the cylinder; the injection control section that controls the fuel injection operation by the injector; and the ignition control section that controls the ignition operation by the ignition plug. When the partial compression ignition combustion is carried out, the ignition control section causes the ignition plug to carry out: the main ignition in which the spark is generated in the late period of the compression stroke or the initial period of the expansion stroke to initiate the SI combustion; and the preceding ignition in which the spark is generated at the earlier timing than the main ignition. When the partial compression ignition combustion is carried out, the injection control section causes the injector to inject the fuel at such timing that the fuel exists in the cylinder at the earlier time point than the preceding ignition. The timing of the preceding ignition is set to be more retarded when the in-cylinder pressure specified by the in-cylinder pressure specification section is high than when the in-cylinder pressure is low.

According to such a configuration, when the partial compression ignition combustion is carried out, the main ignition, in which the spark is generated in the late period of the compression stroke or the initial period of the expansion stroke (that is, timing to generate the torque) to initiate the SI combustion, and the preceding ignition, in which the spark is generated at such timing that the fuel exists in the cylinder and that is earlier than the main ignition. Accordingly, when the temperature around the spark (the arc) is increased to the appropriate temperature by using this preceding ignition, it is possible to modify the property of the fuel such that the thermal efficiency during the CI combustion is increased while the flame propagation of the air-fuel mixture is suppressed. In detail, the fuel component (hydrocarbons) is cleaved by increasing the temperature thereof, so as to produce hydrogen peroxide ($H_2O_2$) and formaldehyde ($CH_2O$), and OH radicals from these components can be produced. OH radicals have the strong oxidation behavior and are high in reactivity. Thus, when the intermediate product containing such OH radicals is produced in the cylinder after the preceding ignition, the combustion velocity of the CI combustion as the phenomenon in which the spontaneous chemical reaction of the fuel component occurs can be accelerated, which can improve the thermal efficiency.

Here, in order to modify the property of the fuel by the preceding ignition as described above (to produce the intermediate product such as OH radicals while sufficiently suppressing the flame propagation), it is necessary to appropriately adjust the timing of the preceding ignition according to the various types of the environment in the cylinder. The inventors of the present application performed the earnest study on this point and understood that the flame propagation was less likely to occur when the ignition timing was advanced and that the limit timing of the ignition timing, at which the flame propagation occurs, (the limit timing: such ignition timing that the flame propagation occurs when the ignition timing is retarded from this limit timing) was retarded with the increase in the in-cylinder pressure (however, the parameters other than the in-cylinder pressure were constant), in other words, the most retarded timing in the range of the ignition timing, within which the flame propagation did not occur, is advanced with the reduction in the in-cylinder pressure. That is, it was understood that, as the in-cylinder pressure was reduced, the flame propagation was likely to occur, and unless the ignition timing was further advanced and the ignition was carried out at such timing that the significant flow occurred in the cylinder, the flame grew without being blown off, and the flame propagation occurred.

Meanwhile, in the above configuration, the timing of the preceding ignition is set to be retarded when the in-cylinder pressure specified by the in-cylinder pressure specification section is high than when the in-cylinder pressure is low. Accordingly, when the in-cylinder pressure is high and the flame propagation is less likely to occur, the timing of the preceding ignition is retarded. When the in-cylinder pressure is low and the flame propagation is likely to occur, the timing of the preceding ignition is advanced. In this way, it is possible to apply the energy corresponding to the difference in the flame propagation property by the preceding ignition at the appropriate timing. As a result, within the range where the flame propagation of the air-fuel mixture does not occur or hardly occurs, it is possible to appropriately heat the air-fuel mixture to the temperature zone in which the property of the air-fuel mixture is sufficiently modified, and it is thus possible to reliably produce the intermediate product that contributes to the acceleration of the CI combustion.

In order to appropriately modify the property of the fuel by the preceding ignition, it is preferred to set the energy of the preceding ignition to be lower than the energy of the main ignition. In detail, the energy and the timing of the preceding ignition are preferably set to such energy and such timing that the high-temperature portion at equal to or higher than 850 K and lower than 1140 K is generated around the spark generated from the ignition plug and that the flame propagation of the air-fuel mixture does not occur.

With these configurations, while the sufficient amount of the intermediate product is produced by the preceding ignition, it is possible to avoid the intermediate product from being consumed prior to the main ignition (by the unintended flame propagation by the preceding ignition).

Here, it has been understood that, as the further detailed knowledge on the relationship between the limit timing of the timing of the preceding ignition, at which the flame propagation occurs, (hereinafter also simply referred to as the limit timing) and the in-cylinder pressure, the change rate of the limit timing with respect to the in-cylinder pressure is higher in the range where the in-cylinder pressure is low than in the range where the in-cylinder pressure is high. Accordingly, the ignition control section preferably controls the ignition plug such that the timing of the preceding ignition is retarded with the increase in the in-cylinder pressure, and preferably sets the change rate of the timing of the preceding ignition with respect to the in-cylinder pressure to be higher in the range where the in-cylinder pressure is low than in the range where the in-cylinder pressure is high.

With this configuration, it is possible to carry out the preceding ignition at the appropriate timing that conforms to the change characteristic of the limit timing as described above, and it is thus possible to sufficiently modify the property of the fuel so as to accelerate the CI combustion.

The timing of the preceding ignition is preferably set during the intake stroke or in the early period or the middle period of the compression stroke.

In the case where the preceding ignition is carried out at the timing that is sufficiently advanced from the compression top dead center, it is possible to reliably modify the property of the fuel after the injection by the preceding ignition so as to accelerate the CI combustion while the unintended occurrence of the flame propagation by the preceding ignition is avoided.

In the case where the preceding ignition is carried out during the intake stroke or in the early period or the middle period of the compression stroke, the sufficient interval is likely to be secured between the preceding ignition and the main ignition. Accordingly, the preceding ignition and the main ignition are preferably carried out by the single ignition plug having the single ignition circuit per cylinder.

With such a configuration, it is possible to carry out the preceding ignition and the main ignition by a simple method using the existing ignition plug.

The number of the preceding ignition is not limited to one in one cycle, and the plural times of the preceding ignition may be carried out. However, according to the study by the inventors of the present application, even in the case where the preceding ignition is carried out more than three times, the obtained effect is hardly changed from the effect obtained when the preceding ignition is carried out three times. Thus, it is preferred that the number of the preceding ignition in one cycle is equal to or less than three.

With such a configuration, it is possible to suppress wear of an electrode of the ignition plug while securing the effect of the preceding ignition to accelerate the CI combustion.

The in-cylinder pressure specification section can be used as the in-cylinder pressure sensor that detects the in-cylinder pressure.

With such a configuration, it is possible to specify the in-cylinder pressure with a high degree of accuracy by the direct detection using the in-cylinder pressure sensor.

The in-cylinder pressure specification section may estimate the in-cylinder pressure on the basis of such a specified parameter that the in-cylinder pressure is increased with the increase in the value of the parameter. In this case, at least one of the flow rate of the intake air that is introduced into the cylinder through the intake passage, the opening degree of the throttle valve that is provided in the intake passage, the flow rate of the EGR gas that is recirculated from the exhaust passage into the intake passage, the engine load, and the accelerator operation amount can be set as the parameter.

Preferably, the openable/closable swirl valve provided in the intake port that communicates with the cylinder is further provided, and the opening degree of the swirl valve is controlled such that the swirl ratio in the cylinder becomes equal to or higher than 1.5 in the operation range where the preceding ignition and the main ignition are carried out.

With such a configuration, the intermediate product that is produced by the preceding ignition can be spread over the large area of the cylinder in the short time by the swirl flow. Thus, by using this spread intermediate product, it is possible to effectively increase the combustion velocity in the CI combustion that is simultaneously and frequently initiated in various portions of the cylinder.

Preferably, the setting section for setting the target SI rate, which is the target value of the ratio of the heat generation amount by the SI combustion to the total heat generation amount in one cycle, according to the engine operation condition is further provided, and the ignition control section sets the main ignition timing on the basis of the target SI rate set by the setting section.

In the case where the main ignition timing is adjusted to carry out the partial compression ignition combustion that conforms to the target SI rate just as described, it is possible to increase the ratio of the CI combustion (that is, reduce the SI rate) as much as possible within the range where the combustion noise does not become excessive, for example. Together with the effect exerted by the modification of the property of the fuel by the preceding ignition (the acceleration of the CI combustion), this can lead to as much improvement in the thermal efficiency as possible by the partial compression ignition combustion.

Here, the preceding ignition, which is carried out prior to the main ignition, only functions to produce the intermediate product containing OH radicals (and thereby increase the combustion velocity in the CI combustion). Thus, even in the case where the energy or the timing of the preceding ignition is changed, the SI rate is not particularly influenced by such a change. This means that the main ignition timing for obtaining the target SI rate can uniquely be specified independently from the energy or the timing of the preceding ignition. That is, according to the above configuration, it is possible to specify the main ignition timing for obtaining the target SI rate with the high degree of accuracy while carrying out the preceding ignition to produce the sufficient amount of the intermediate product.

Preferably, the ignition control section executes the preceding ignition and the main ignition only in the portion on the low-load side of the operation range where the partial compression ignition combustion is carried out.

With such a configuration, it is possible to effectively avoid the abnormal combustion caused by the CI combustion that is accelerated by the preceding ignition. That is, in the case where the preceding ignition and the main ignition are carried out uniformly in the range where the partial compression ignition combustion is carried out, the combustion velocity in the CI combustion is excessively increased on the high-load side in the same range, which increases the possibility of the abnormal combustion such as knocking. Meanwhile, in the above configuration, the preceding ignition is carried out only in the portion on the low-load side of the range where the partial compression ignition combustion is carried out, and the preceding ignition is prohibited on the high-load side. Thus, it is possible to effectively avoid the abnormal combustion such as knocking.

Preferably, in the operation range where the preceding ignition and the main ignition are carried out, the partial compression ignition combustion is carried out under the lean A/F environment where the air-fuel ratio as the ratio between the air and the fuel in the cylinder exceeds 20 and is lower than 35, or the partial compression ignition combustion is carried out under the lean G/F environment where the gas air-fuel ratio as the ratio between the entire gas and the fuel in the cylinder exceeds 18 and is lower than 50 and the air-fuel ratio substantially matches the stoichiometric air-fuel ratio.

With such a configuration, it is possible to suppress the combustion temperature of the air-fuel mixture to be kept low while the CI combustion is accelerated by the preceding ignition (and the thermal efficiency is thereby improved). Thus, it is possible to effectively suppress the amount of NOx produced in association with the combustion.

Preferably, the injection control section causes the injector to carry out the second injection, in which the fuel is injected prior to the preceding ignition, and the first injection, in which the fuel is injected prior to the second injection.

With such a configuration, when the injection amount/the injection timing of the fuel by the first injection and the second injection are set according to the engine operation condition, it is possible to adjust the degree of the stratification (or the degree of the homogeneity) of the air-fuel mixture such that the appropriate partial compression ignition combustion is carried out under each of the operation conditions.

In the above configuration, further preferably, the injection control section controls the injector such that the fuel injection amount by the first injection is larger than the fuel injection amount by the second injection.

In the case where the injection amount by the first injection at the early injection timing is relatively increased just as described, it is possible to effectively avoid the excessive stratification of the fuel and degradation of the emission performance.

The control apparatus in the embodiment can also be said to have the following characteristics. More specifically, the control apparatus is the apparatus for controlling the engine that includes: the cylinder; and the injector and the ignition plug disposed in the manner to face the cylinder. The control apparatus includes: the in-cylinder pressure correlation value sensor that detects the parameter related to the in-cylinder pressure as the pressure in the cylinder; the temperature adjustment device that adjusts the in-cylinder temperature as the temperature in the cylinder; and the controller including the electric circuit electrically connected to the injector, the ignition plug, the in-cylinder pressure correlation value sensor, and the temperature adjustment device, accepting the detection signal from the in-cylinder pressure correlation value sensor, and outputting the control signal to each of the injector, the ignition plug, and the temperature adjustment device. The controller has: the injection control section that drives the injector to inject the fuel at the specified timing corresponding to the operation state of the engine; the in-cylinder temperature adjustment section that drives the in-cylinder temperature adjustment device to adjust the in-cylinder temperature such that the air-fuel mixture of the fuel injected by the injector and the air is subjected to the flame propagation combustion by the spark ignition using the ignition plug and that the compression self-ignition combustion is carried out after the initiation of this flame propagation combustion; the first ignition control section that drives the ignition plug for the spark ignition after the fuel injection by the injector; the second ignition control section that drives the ignition plug for the spark ignition after the spark ignition by the first ignition control section, so as to subject the air-fuel mixture to the flame propagation combustion by the spark ignition; and the ignition timing setting section that sets the timing of the spark ignition by the first ignition control section to be more retarded when the in-cylinder pressure is high than when the in-cylinder pressure is low on the basis of the output value of the in-cylinder pressure correlation value sensor.

With such a configuration, similar to the above-described configuration, it is possible to modify the property of the fuel in the manner to increase the combustion velocity of the combustion by the compression self-ignition, and it is thus possible to improve the thermal efficiency.

The invention claimed is:

1. A control apparatus for controlling a compression-ignition type engine that includes: a cylinder; an injector that injects fuel into the cylinder; and an ignition plug that ignites air-fuel mixture, in which the fuel injected from the injector and air are mixed, and that can carry out partial compression ignition combustion to subject a first portion of the air-fuel mixture to spark ignition (SI) combustion by spark ignition using the ignition plug and to subject a remaining portion of the air-fuel mixture to compression ignition (CI) combustion by self-ignition, the control apparatus for the compression-ignition type engine comprising:

an in-cylinder pressure specification section that specifies an in-cylinder pressure as a pressure in the cylinder;

an injection control section that controls a fuel injection operation by the injector; and an ignition control section that controls an ignition operation by the ignition plug, wherein an operation range of the partial compression ignition combustion includes a first operation range and a second operation range, in which the second operation range is on a higher-load side than the first operation range, wherein, in the second operation range, the partial compression ignition combustion is carried out under such an environment that an air-fuel ratio as a ratio between the air and the fuel in the cylinder substantially matches a stoichiometric air-fuel ratio, wherein, in the first operation range, the partial compression ignition combustion is carried out under a lean air-fuel environment where the air-fuel ratio is larger than that in the second operation range, wherein, in the first operation range, the ignition control section causes the ignition plug to carry out: a main ignition in which a spark is generated in a late period of a compression stroke or an initial period of an expansion stroke to initiate the SI combustion; and a preceding ignition in which the spark is generated at an earlier timing than the main ignition, wherein, in the first operation range, the injection control section causes the injector to inject the fuel at such a timing that the fuel exists in the cylinder at an earlier time point than the preceding ignition, wherein a timing of the preceding ignition is set to be more retarded when the in-cylinder pressure specified by the in-cylinder pressure specification section is high than when the in-cylinder pressure is low, and wherein, in the second operation range, the ignition control section causes the ignition plug to carry out the main ignition without carrying out the preceding ignition.

2. The control apparatus for the compression-ignition type engine according to claim 1, wherein an energy of the preceding ignition is lower than an energy of the main ignition.

3. The control apparatus for the compression-ignition type engine according to claim 2, wherein the energy and the timing of the preceding ignition are set to such an energy and such a timing that a high-temperature portion at equal to or higher than 850 K and lower than 1140 K is generated around the spark generated from the ignition plug and that flame propagation of the air-fuel mixture does not occur.

4. The control apparatus for the compression-ignition type engine according to claim 3, wherein the ignition control section controls the ignition plug such that the timing of the preceding ignition is retarded with an increase in the in-cylinder pressure, and sets a change rate of the timing of the preceding ignition with respect to the in-cylinder pressure to be higher in a range where the in-cylinder pressure is low than in a range where the in-cylinder pressure is high.

5. The control apparatus for the compression-ignition type engine according to claim 1, wherein the timing of the preceding ignition is set during an intake stroke or in an early period or a middle period of the compression stroke.

6. The control apparatus for the compression-ignition type engine according to claim 5, wherein the preceding ignition and the main ignition are carried out by a single ignition plug having a single ignition circuit for each of a plurality of cylinders.

7. The control apparatus for the compression-ignition type engine according to claim 6, wherein the number of the preceding ignition in one cycle is set to three or less.

8. The control apparatus for the compression-ignition type engine according to claim 1, wherein the in-cylinder pressure specification section is an in-cylinder pressure sensor that detects the in-cylinder pressure.

9. The control apparatus for the compression-ignition type engine according to claim 1, wherein the in-cylinder pressure specification section estimates the in-cylinder pressure on the basis of such a specified parameter that the in-cylinder pressure is increased with an increase in a value of the parameter, and wherein the parameter is at least one of a flow rate of intake air that is introduced into the cylinder through an intake passage, an opening degree of a throttle valve that is provided in the intake passage, a flow rate of exhaust gas recirculation (EGR) gas that is recirculated from an exhaust passage into the intake passage, an engine load, and an accelerator operation amount.

10. The control apparatus for the compression-ignition type engine according to claim 1 further comprising:

an openable/closable swirl valve that is provided in an intake port communicating with the cylinder, wherein an opening degree of the swirl valve is controlled such that a swirl ratio in the cylinder becomes equal to or higher than 1.5 in an operation range where the preceding ignition and the main ignition are carried out.

11. The control apparatus for the compression-ignition type engine according to claim 1 further comprising:

a setting section that sets a target SI rate as a target value of a ratio of a heat generation amount by the SI combustion to a total heat generation amount in one cycle according to an engine operation condition, wherein the ignition control section sets a timing of the main ignition on the basis of the target SI rate that is set by the setting section.

12. The control apparatus for the compression-ignition type engine according to claim 1, wherein, in the operation range where the preceding ignition and the main ignition are carried out, the partial compression ignition combustion is carried out under the lean air-fuel environment where an air-fuel ratio as a ratio between the air and the fuel in the cylinder is higher than 20 and is lower than 35.

13. The control apparatus for the compression-ignition type engine according to claim 1, wherein the injection control section causes the injector to carry out a second injection, in which the fuel is injected prior to the preceding ignition, and a first injection, in which the fuel is injected prior to said second injection.

14. The control apparatus for the compression-ignition type engine according to claim 13, wherein the injection control section controls the injector such that a fuel injection amount by the first injection is larger than a fuel injection amount by the second injection.

15. A control apparatus for controlling a compression-ignition type engine that includes: a cylinder; and an injector and an ignition plug disposed in a manner to face the cylinder and ignite an air-fuel mixture, in which fuel injected from the injector and air are mixed, the engine configured to carry out partial compression ignition combustion to subject some of the air-fuel mixture to spark ignition (SI) combustion by spark ignition using the ignition plug and to subject the rest of the air-fuel mixture to compression ignition (CI) combustion by self-ignition, the control apparatus for the compression-ignition type engine comprising:

an in-cylinder pressure correlation value sensor that detects a parameter correlated with an in-cylinder pressure as a pressure in the cylinder;

an in-cylinder temperature adjustment device that adjusts an in-cylinder temperature as a temperature in the cylinder; and a controller that includes an electric circuit electrically connected to the injector, the ignition plug, the in-cylinder pressure correlation value sensor, and the temperature adjustment device, that accepts a detection signal from the in-cylinder pressure correlation value sensor, and that outputs a control signals to each of the injector, the ignition plug, and the temperature adjustment device, wherein an operation range of the partial compression ignition combustion includes a first operation range and a second operation range, in which the second operation range is on a higher-load side than the first operation range, wherein, in the second operation range, the partial compression ignition combustion is carried out under such an environment that an air-fuel ratio as a ratio between the air and the fuel in the cylinder substantially matches a stoichiometric air-fuel ratio, wherein, in the first operation range, the partial compression ignition combustion is carried out under a lean air-fuel environment where the air-fuel ratio is larger than that in the second operation range, wherein the controller has:
- an injection control section that drives the injector at specified timing corresponding to an operation state of the engine so as to inject fuel;
- an in-cylinder temperature adjustment section that drives the in-cylinder temperature adjustment device to adjust the in-cylinder temperature such that air-fuel mixture of the fuel injected by the injector and air is subjected to flame propagation combustion by spark ignition using the ignition plug and that compression self-ignition combustion is carried out after initiation of this flame propagation combustion;
- a first ignition control section that drives the ignition plug for the spark ignition after the injector injects the fuel;
- a second ignition control section that drives the ignition plug for the spark ignition after the spark ignition by the first ignition control section so as to subject the air-fuel mixture to the flame propagation combustion by said spark ignition; and
- an ignition timing setting section that sets a timing of the spark ignition by the first ignition control section to be more retarded when the in-cylinder pressure is high than when the in-cylinder pressure is low on the basis of an output value of the in-cylinder pressure correlation value sensor, wherein, in the first operation range, the second ignition control section causes the ignition plug to carry out a main ignition in which a spark is generated in a late period of a compression stroke or an initial period of an expansion stroke to initiate the SI combustion; and the first ignition control section causes the ignition plug to carry out a preceding ignition in which the spark is generated at an earlier timing than the main ignition, wherein, in the first operation range, the injection control section causes the injector to inject the fuel at such a timing that the fuel exists in the cylinder at an earlier time point than the preceding ignition, and wherein, in the second operation range, the second ignition control section causes the ignition plug to carry out the main ignition, and the first ignition control section does not cause the ignition plug to carry out the preceding ignition.

16. The control apparatus for the compression-ignition type engine according to claim 2,
wherein the in-cylinder pressure specification section is an in-cylinder pressure sensor that detects the in-cylinder pressure, and
wherein, in the first operation range where the preceding ignition and the main ignition are carried out, the partial compression ignition combustion is carried out under the lean air-fuel environment where an air-fuel ratio as a ratio between the air and the fuel in the cylinder is higher than 20 and is lower than 35.

17. The control apparatus for the compression-ignition type engine according to claim 2,
wherein the in-cylinder pressure specification section estimates the in-cylinder pressure on the basis of such a specified parameter that the in-cylinder pressure is increased with an increase in a value of the parameter, and
wherein the parameter is at least one of a flow rate of intake air that is introduced into the cylinder through an intake passage, an opening degree of a throttle valve that is provided in the intake passage, a flow rate of exhaust gas recirculation (EGR) gas that is recirculated from an exhaust passage into the intake passage, an engine load, and an accelerator operation amount.

18. The control apparatus for the compression-ignition type engine according to claim 4,
wherein, in the operation range where the preceding ignition and the main ignition are carried out, the partial compression ignition combustion is carried out under the lean air-fuel environment where an air-fuel ratio as a ratio between the air and the fuel in the cylinder is higher than 20 and is lower than 35.

19. A control apparatus for controlling a compression-ignition type engine that includes: a cylinder; an injector that injects fuel into the cylinder; and an ignition plug that ignites an air-fuel mixture, in which the fuel injected from the injector and air are mixed, and that can carry out partial compression ignition combustion to subject a first portion of the air-fuel mixture to spark ignition (SI) combustion by spark ignition using the ignition plug, and to subject a remaining portion of the air-fuel mixture to compression ignition (CI) combustion by self-ignition, the control apparatus for the compression-ignition type engine comprising:
- an in-cylinder pressure specification section that specifies an in-cylinder pressure as a pressure in the cylinder;
- an injection control section that controls a fuel injection operation by the injector; and
- an ignition control section that controls an ignition operation by the ignition plug, wherein, when the partial compression ignition combustion is carried out, the ignition control section causes the ignition plug to carry out: a main ignition in which a spark is generated in a late period of a compression stroke or an initial period of an expansion stroke to initiate the SI combustion; and a preceding ignition in which the spark is generated at an earlier timing than the main ignition, wherein, when the partial compression ignition combustion is carried out, the injection control section causes the injector to inject the fuel at such a timing that the fuel exists in the cylinder at an earlier time point than the preceding ignition, wherein a timing of the preceding ignition is set to be more retarded when the in-cylinder pressure at a close timing of an intake valve specified by the in-cylinder pressure specification section is high than when the in-cylinder pressure is low, and wherein the in-cylinder pressure specification section is an in-cylinder pressure sensor that detects the in-cylinder pressure.

20. The control apparatus for the compression-ignition type engine according to claim 19, wherein the timing of the preceding ignition is set to be more retarded as the in-cylinder pressure at the close timing of the intake valve is higher.

* * * * *